US009729299B2

(12) United States Patent
Barriac et al.

(10) Patent No.: US 9,729,299 B2
(45) Date of Patent: Aug. 8, 2017

(54) METHODS AND SYSTEMS FOR COMMUNICATION IN DENSE WIRELESS ENVIRONMENTS

(71) Applicant: QUALCOMM Incorporated, San Diego, CA (US)

(72) Inventors: Gwendolyn Denise Barriac, Encinitas, CA (US); Simone Merlin, Solana Beach, CA (US); Rahul Tandra, San Diego, CA (US); Sameer Vermani, San Diego, CA (US); Yan Zhou, San Diego, CA (US); Bin Tian, San Diego, CA (US); Hemanth Sampath, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 84 days.

(21) Appl. No.: 14/265,132

(22) Filed: Apr. 29, 2014

(65) Prior Publication Data

US 2014/0328192 A1 Nov. 6, 2014

Related U.S. Application Data

(60) Provisional application No. 61/819,059, filed on May 3, 2013, provisional application No. 61/819,364, filed on May 3, 2013.

(51) Int. Cl.
*H04L 5/00* (2006.01)
*H04J 1/14* (2006.01)
(Continued)

(52) U.S. Cl.
CPC .............. *H04L 5/0073* (2013.01); *H04J 1/14* (2013.01); *H04J 1/16* (2013.01); *H04L 5/0005* (2013.01);
(Continued)

(58) Field of Classification Search
CPC ....................................................... H04L 5/0073
See application file for complete search history.

(56) References Cited

U.S. PATENT DOCUMENTS

| 7,436,801 B1 | 10/2008 | Kanterakis |
| 8,331,951 B2 | 12/2012 | Sigmund |

(Continued)

FOREIGN PATENT DOCUMENTS

| EP | 2302964 A1 | 3/2011 |
| EP | 2490500 A1 | 8/2012 |

(Continued)

OTHER PUBLICATIONS

Charfi E., et al., "Upcoming WLANs MAC Access Mechanisms: An Overview", Communication Systems, Networks & Digital Signal Processing (CSNDSP), 2012 8th International Symposium on, IEEE, Jul. 18, 2012 (Jul. 18, 2012), pp. 1-6, 0 XP032237054, DOI: 10.1109/CSNDSP.2012.6292711, ISBN: 978-1-4577-1472-6.

(Continued)

*Primary Examiner* — Jason Mattis
(74) *Attorney, Agent, or Firm* — Knobbe, Martens, Olson & Bear LLP

(57) ABSTRACT

Systems, methods, and computer readable storage media communicate with a wireless device within a dense wireless environment. In one aspect, a method includes determining whether a wireless device is subject to interference, adjusting a transmission attribute based on the determining, and transmitting a message to the wireless device based on the adjusted transmission attribute. In some aspects, adjusting a transmission attribute may include selecting one or more of time division multiplexing or frequency division multiplexing when communicating with the wireless device. In some aspects, particular time periods and/or particular frequency (Continued)

bands may be selected for communication with the device depending on whether the device is subject to interference.

129 Claims, 16 Drawing Sheets

(51) Int. Cl.
  *H04J 1/16* (2006.01)
  *H04W 24/08* (2009.01)
  *H04W 72/08* (2009.01)
  *H04W 74/08* (2009.01)
  *H04W 72/04* (2009.01)

(52) U.S. Cl.
  CPC ......... *H04W 24/08* (2013.01); *H04W 72/082* (2013.01); *H04W 72/042* (2013.01); *H04W 74/0808* (2013.01)

(56) References Cited

U.S. PATENT DOCUMENTS

| | | | |
|---|---|---|---|
| 8,355,389 B2 | 1/2013 | Kasslin et al. | |
| 8,498,578 B2 | 7/2013 | Abraham et al. | |
| 8,522,088 B2 | 8/2013 | Kim et al. | |
| 2007/0060155 A1 | 3/2007 | Kahana et al. | |
| 2007/0133489 A1 | 6/2007 | Ramesh et al. | |
| 2007/0270102 A1 | 11/2007 | Zhu et al. | |
| 2008/0084821 A1* | 4/2008 | Maze | H04L 43/0847 370/232 |
| 2009/0207747 A1 | 8/2009 | Kim et al. | |
| 2010/0232436 A1* | 9/2010 | Fujii | H04B 7/2606 370/400 |
| 2011/0003598 A1* | 1/2011 | Ma | H04W 72/0426 455/452.1 |
| 2011/0110340 A1 | 5/2011 | Lakkis | |
| 2011/0194644 A1 | 8/2011 | Liu et al. | |
| 2011/0261764 A1* | 10/2011 | Shirakata | H04W 72/082 370/329 |
| 2011/0305156 A1 | 12/2011 | Liu et al. | |
| 2012/0082109 A1 | 4/2012 | Hong et al. | |
| 2012/0093134 A1 | 4/2012 | Zuniga et al. | |
| 2012/0099450 A1 | 4/2012 | Madan et al. | |
| 2012/0207074 A1 | 8/2012 | Kneckt | |
| 2012/0314583 A1 | 12/2012 | Hart et al. | |
| 2012/0327870 A1 | 12/2012 | Grandhi et al. | |
| 2013/0017794 A1 | 1/2013 | Kloper et al. | |
| 2013/0051260 A1 | 2/2013 | Liu | |
| 2013/0058218 A1 | 3/2013 | Wu et al. | |
| 2013/0070627 A1 | 3/2013 | Chen et al. | |
| 2013/0136013 A1 | 5/2013 | Kneckt et al. | |
| 2013/0171999 A1 | 7/2013 | Katar et al. | |
| 2013/0182784 A1 | 7/2013 | Wang et al. | |
| 2013/0203429 A1 | 8/2013 | Kneckt et al. | |
| 2013/0235737 A1 | 9/2013 | Merlin et al. | |
| 2014/0050156 A1 | 2/2014 | Chan et al. | |
| 2014/0064101 A1 | 3/2014 | Hart et al. | |
| 2014/0328191 A1 | 11/2014 | Barriac et al. | |
| 2014/0328268 A1 | 11/2014 | Zhu et al. | |
| 2014/0328269 A1 | 11/2014 | Zhu et al. | |
| 2014/0328270 A1 | 11/2014 | Zhu et al. | |
| 2015/0078299 A1 | 3/2015 | Barriac et al. | |
| 2015/0098378 A1* | 4/2015 | Dore | H04W 24/02 370/311 |
| 2015/0124744 A1 | 5/2015 | Zhu et al. | |
| 2015/0139002 A1* | 5/2015 | Lee | H04J 11/00 370/252 |

FOREIGN PATENT DOCUMENTS

| | | |
|---|---|---|
| WO | WO-2006115823 A2 | 11/2006 |
| WO | WO-2007027442 A2 | 3/2007 |
| WO | WO-2011053775 A1 | 5/2011 |
| WO | WO-2013012263 A1 | 1/2013 |
| WO | WO-2013012807 A1 | 1/2013 |

OTHER PUBLICATIONS

International Search Report and Written Opinion—PCT/US2014/036123—ISA/EPO—Oct. 14, 2014.

Partial International Search Report—PCT/US2014/036123—ISA/EPO—Aug. 7, 2014.

Merlin S., et al., "Systems and Methods for Extending the Range of Wireless Communications," U.S. Appl. No. 61/722,008, filed Nov. 2, 2012, pp. 48.

\* cited by examiner

METHODS AND SYSTEMS FOR COMMUNICATION IN DENSE WIRELESS ENVIRONMENTS

CROSS REFERENCE TO RELATED APPLICATIONS

This Application claims the benefit of U.S. Provisional Application No. 61/819,059, filed May 3, 2013, and entitled "METHODS AND SYSTEMS FOR COMMUNICATION IN DENSE WIRELESS ENVIRONMENTS" and assigned to the assignee hereof. This application also claims the benefit of U.S. Provisional Application No. 61/819,364, filed May 3, 2013 and entitled "METHODS AND SYSTEMS FOR COMMUNICATION IN DENSE WIRELESS ENVIRONMENTS," and assigned to the assignee hereof. The disclosure of these prior applications are considered part of this application, and are hereby incorporated by reference in their entirely.

FIELD

The present application relates generally to wireless communications, and more specifically to systems, methods, and devices for wireless communication in dense wireless environments.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect disclosed is a method of transmitting a wireless message from a first wireless device to a second wireless device in a dense wireless environment. The method includes determining whether the second wireless device is subject to interference, adjusting a transmission attribute based on the determining, and transmitting a message to the second wireless device based on the adjusted transmission attribute. In some aspects, adjusting a transmission attribute comprises determining a set of multiplexing parameters for use in transmitting a message to the second wireless device. In some aspects, determining whether the second wireless device is subject to interference is based on one or more of more of a distance from the first wireless device to the second wireless device, network statistics associated with communications between the first wireless device and second wireless device, and a wireless link condition or topology between the first wireless device and the second wireless device. In some aspects, the network statistics comprise a packet error rate. In some aspects, the second wireless device is determined to be subject to interference if the packet error rate is above an error threshold. In some aspects, the network statistics comprise a signal strength of the second wireless device. In some aspects, the second wireless device is determined to be subject to interference if the signal strength of the second wireless device is below a strength threshold. In some aspects, the method includes transmitting one or more messages to the second wireless device during a first recurring time period if the second wireless device is subject to interference; and transmitting one or more messages to the second wireless device during a second recurring time period if the second wireless device is not subject to interference. In some aspects, the method also includes transmitting one or more messages to a third wireless device during the first recurring time period if the third wireless device is subject to interference; and transmitting one or more messages to the third device during the second recurring time period if the third wireless device is not subject to interference.

In some aspects, the method also includes transmitting a message to the second wireless device indicating when the first or second recurring time periods occur. In some aspects, the message is broadcast. In some aspects, the message is transmitted to the second wireless device if the second wireless device is subject to interference. In some aspects, the indication is based on a beacon interval. In some aspects, the message is a beacon message.

In some aspects, the indication of the first or second time period is relative to timing of a beacon message. In some aspects, the method also includes transmitting a message to an access point, the message indicating when the first or second recurring time period occurs. In some aspects, the method also includes receiving a message from an access point, the message indicating the first or second recurring time period. In some aspects, a first number of access points communicate during the first recurring time period, and a second number of access points communicate during the second recurring time period. In some aspects, the first number is less than the second number. In some aspects, the method also includes determining a first frequency band, wherein messages transmitted during the first recurring time period are transmitted within the first frequency band, and wherein a third access point communicates in a second frequency band during the first recurring time period.

In some aspects, the method also includes determining of the first frequency band comprises randomly selecting the first frequency band. In some aspects, determining of the first frequency band is based on communication with a second access point. In some aspects, the method also includes receiving a message assigning communications during the first recurring time period to the first frequency band, wherein the determining is based on the received message. In some aspects, the first frequency band corresponds to a primary channel.

In some aspects, the method also includes determining a plurality of candidate recurring time periods; and randomly selecting the first recurring time period from the plurality of candidate recurring time periods. In some aspects, the method also includes determining a duration of the first or second recurring time period based on a network load. In some aspects, the method also includes determining a duration of the first or second recurring time period based on a number of failed MCS0 connection requests by associated stations. In some aspects, the method also includes monitoring communications with the second wireless device after adjustment of the transmission attribute; and further adjusting the transmission attribute based on the monitoring. In some aspects, further adjusting the transmission attribute comprises selecting a third set of multiplexing parameters. In some aspects, a first frequency band indicating by the first set of multiplexing parameters is different than a second frequency band indicated by the third set of multiplexing parameters. In some aspects, the method also includes determining a frequency schedule based on communications with one or more access points, wherein the further adjusting is based on at least the frequency schedule. In some aspects, the frequency schedule indicates one or more of the number of recurring time periods or frequency bands, a size or duration of recurring time periods or frequency bands, a time reference for a set of recurring time periods or frequency bands.

Another aspect disclosed is an apparatus for transmitting a wireless message from a first wireless device to a second wireless device in a dense wireless environment. The apparatus includes a processor configured to determine whether the second wireless device is subject to interference; a processor configured to adjust a transmission attribute based on the determining; and a transmitter configured to transmit a message to the second wireless device based on the adjusted transmission attribute. In some aspects, the processor is configured to adjust the transmission attribute by determining a set of multiplexing parameters for use in transmitting a message to the second wireless device.

In some aspects, the processor is configured to determine whether the second wireless device is subject to interference based on one or more of more of a distance from the first wireless device to the second wireless device, network statistics associated with communications between the first wireless device and second wireless device, and a wireless link condition or topology between the first wireless device and the second wireless device. In some aspects, the network statistics comprise a packet error rate. In some aspects, the processor is configured to determine that the second wireless device is subject to interference if the packet error rate is above an error threshold. In some aspects, the network statistics comprise a signal strength of the second wireless device.

In some aspects, the processor is configured to determine that the second wireless device is subject to interference if the signal strength is below a strength threshold. In some aspects, the apparatus also includes a transmitter configured to transmit one or more messages to the second wireless device during a first recurring time period if the second wireless device is subject to interference, a transmitter configured to transmit one or more messages to the second wireless device during a second recurring time period if the second wireless device is not subject to interference.

In some aspects, the apparatus also includes a transmitter configured to transmit one or more messages to the third wireless device during the first recurring time period if a third wireless device is subject to interference; and a transmitter configured to transmit one or more messages to the third device during a second recurring time period if the third wireless device is not subject to interference.

In some aspects, the apparatus also includes a transmitter configured to transmit a message to the second wireless device indicating when the first or second recurring time periods occur. In some aspects, the message is broadcast. In some aspects, the message is transmitted to the second wireless device if the second wireless device is subject to interference. In some aspects, the indication is based on a beacon interval. In some aspects, the message is a beacon message. In some aspects, the indication of the first or second time period is relative to timing of a beacon message. In some aspects, the apparatus also includes a transmitter configured to transmit a message to an access point, the message indicating when the first or second recurring time periods occur. In some aspects, the apparatus also includes a receiver configured to receive a message from an access point, the message indicating the first or second recurring time period. In some aspects, a first number of access points communicate during the first recurring time period, and a second number of access points communicate during the second recurring time period, and wherein the first number is less than the second number. In some aspects, the apparatus also includes a processor configured to determine a first frequency band, wherein messages transmitted during the first recurring time period are transmitted within the first frequency band, and wherein a third access point communicates in a second frequency band during the first recurring time period. In some aspects, the processor is configured to determine of the first frequency band by randomly selecting the first frequency band. In some aspects, the processor is configured to determine the first frequency band based on communication with a second access point.

In some aspects, the apparatus also includes a receiver configured to receive a message assigning communications during the first recurring time period to the first frequency band, wherein the processor is configured to determine the frequency band based on the received message. In some aspects, the first frequency band corresponds to a primary channel. In some aspects, the apparatus also includes a processor configured to randomly select the first recurring time period from a plurality of candidate recurring time periods. In some aspects, the apparatus also includes a processor configured to determine a duration of the first or second recurring time period based on a network load. In some aspects, the apparatus also includes a processor configured to determine a duration of the first or second recurring time period based on a number of failed MCS0 connection requests by associated stations.

In some aspects, the apparatus also includes a processor configured to monitor communications with the second wireless device after adjustment of the transmission attribute, and configured to adjust the transmission attribute based on the monitoring. In some aspects, adjusting the transmission attribute comprises selecting a third set of multiplexing parameters.

In some aspects, a first frequency band indicating by the first set of multiplexing parameters is different than a second frequency band indicated by the third set of multiplexing parameters. In some aspects, the apparatus also includes a processor configured to determine a frequency schedule based on communications with one or more access points, wherein the further adjusting is based on at least the frequency schedule.

In some aspects, the frequency schedule indicates one or more of the number of recurring time periods or frequency bands, a size or duration of recurring time periods or frequency bands, a time reference for a set of recurring time periods or frequency bands.

Another aspect disclosed is an apparatus for transmitting a wireless message from a first wireless device to a second wireless device in a dense wireless environment. The apparatus includes means for determining whether the second wireless device is subject to interference, means for adjusting a transmission attribute based on the determining; and means for transmitting a message to the second wireless device based on the adjusted transmission attribute. In some aspects, the means for adjusting a transmission attribute is configured to determine a set of multiplexing parameters for use in transmitting a message to the second wireless device based on whether the second wireless device is subject to interference. In some aspects, the means for determining whether the second wireless device is subject to interference is configured to determine whether the second wireless device is subject to interference based on one or more of more of a distance from the first wireless device to the second wireless device, network statistics associated with communications between the first wireless device and second wireless device, and a wireless link condition or topology between the first wireless device and the second wireless device. In some aspects, the network statistics comprise a packet error rate. In some aspects, the means for determining whether the second wireless device is subject to interference is configured to determine the second wireless device is subject to interference if the packet error rate is above an error threshold. In some aspects, the network statistics comprise a signal strength of the second wireless device. In some aspects, the means for determining whether the second wireless device is subject to interference is configured to determine the second wireless device is subject to interference if the signal strength is below a strength threshold.

In some aspects, the apparatus also includes means for transmitting one or more messages to the second wireless device during a first recurring time period if the second wireless device is subject to interference, means for transmitting one or more messages to the second wireless device during a second recurring time period if the second wireless device is not subject to interference.

In some aspects, the apparatus also includes means for transmitting one or more messages to the third wireless device during the first recurring time period if a third wireless device is subject to interference; and means for transmitting one or more messages to the third device during the second recurring time period if the third wireless device is not subject to interference.

In some aspects, the apparatus also includes means for transmitting a message to the second wireless device indicating when the first or second recurring time periods occur.

In some aspects, the message is broadcast. In some aspects, the message is transmitted to the second wireless device if the second wireless device is subject to interference. In some aspects, the indication is based on a beacon interval. In some aspects, the message is a beacon message. In some aspects, the indication of the first or second time period is relative to timing of a beacon message.

In some aspects, the apparatus also includes means for transmitting a message to an access point, the message indicating when the first or second recurring time periods occur. In some aspects, the apparatus also includes means for receiving a message from an access point, the message indicating the first or second recurring time period.

In some aspects, a first number of access points communicate during the first recurring time period, and a second number of access points communicate during the second recurring time period, and wherein the first number is less than the second number. In some aspects, the apparatus also includes means for determining a first frequency band, wherein messages transmitted during the first recurring time period are transmitted within the first frequency band, and wherein a third access point communicates in a second frequency band during the first recurring time period. In some aspects, the means for determining the first frequency band is configured to randomly selecting the first frequency band. In some aspects, the means for determining the first frequency band is configured to determine the first frequency band based on communication with a second access point. In some aspects, the apparatus also includes means for receiving a message assigning communications during the first recurring time period to the first frequency band, wherein the determining is based on the received message. In some aspects, the first frequency band corresponds to a primary channel.

In some aspects, the apparatus also includes means for determining a plurality of candidate recurring time periods; and means for randomly selecting the first recurring time period from the plurality of candidate recurring time periods. In some aspects, the apparatus also includes means for determining a duration of the first or second recurring time period based on a network load. In some aspects, the apparatus also includes means for determining a duration of the first or second recurring time period based on a number of failed MCS0 connection requests by associated stations. In some aspects, the apparatus also includes means for monitoring communications with the second wireless device after adjustment of the transmission attribute; and means for further adjusting the transmission attribute based on the monitoring.

In some aspects, the means for further adjusting the transmission attribute is configured to select a third set of multiplexing parameters. In some aspects, a first frequency band indicated by the first set of multiplexing parameters is different than a second frequency band indicated by the third set of multiplexing parameters. In some aspects, the apparatus includes means for determining a frequency schedule based on communications with one or more access points, wherein the further adjusting is based on at least the frequency schedule. In some aspects, the frequency schedule indicates one or more of the number of recurring time periods or frequency bands, a size or duration of recurring time periods or frequency bands, a time reference for a set of recurring time periods or frequency bands.

Another aspect disclosed is a computer readable storage medium comprising instructions that when executed cause a processing system to perform a method of transmitting a wireless message from a first wireless device to a second wireless device in a dense wireless environment. The method includes determining whether the second wireless device is subject to interference, adjusting a transmission attribute based on the determining, and transmitting a message to the second wireless device based on the adjusted transmission attribute. In some aspects, adjusting a transmission attribute comprises determining a set of multiplexing parameters for use in transmitting a message to the second wireless device. In some aspects, determining whether the second wireless device is subject to interference is based on one or more of more of a distance from the first wireless device to the second wireless device, network statistics associated with communications between the first wireless device and second wireless device, and a wireless link condition or topology between the first wireless device and the second wireless device. In some aspects, the network statistics comprise a packet error rate. In some aspects, the second wireless device is determined to be subject to interference if the packet error rate is above an error threshold. In some aspects, the network statistics comprise a signal strength of the second wireless device. In some aspects, the second wireless device is determined to be subject to interference if the signal strength of the second wireless device is below a strength threshold. In some aspects, the method includes transmitting one or more messages to the second wireless device during a first recurring time period if the second wireless device is subject to interference; and transmitting one or more messages to the second wireless device during a second recurring time period if the second wireless device is not subject to interference. In some aspects, the method also includes transmitting one or more messages to a third wireless device during the first recurring time period if the third wireless device is subject to interference; and transmitting one or more messages to the third device during the second recurring time period if the third wireless device is not subject to interference.

In some aspects, the method also includes transmitting a message to the second wireless device indicating when the first or second recurring time periods occur. In some aspects, the message is broadcast. In some aspects, the message is transmitted to the second wireless device if the second wireless device is subject to interference. In some aspects, the indication is based on a beacon interval. In some aspects, the message is a beacon message.

In some aspects, the indication of the first or second time period is relative to timing of a beacon message. In some aspects, the method also includes transmitting a message to an access point, the message indicating when the first or second recurring time period occurs. In some aspects, the method also includes receiving a message from an access point, the message indicating the first or second recurring time period. In some aspects, a first number of access points communicate during the first recurring time period, and a second number of access points communicate during the second recurring time period. In some aspects, the first number is less than the second number. In some aspects, the method also includes determining a first frequency band, wherein messages transmitted during the first recurring time period are transmitted within the first frequency band, and wherein a third access point communicates in a second frequency band during the first recurring time period.

In some aspects, the method also includes determining of the first frequency band comprises randomly selecting the first frequency band. In some aspects, determining of the first frequency band is based on communication with a second access point. In some aspects, the method also includes receiving a message assigning communications during the first recurring time period to the first frequency band, wherein the determining is based on the received message. In some aspects, the first frequency band corresponds to a primary channel.

In some aspects, the method also includes determining a plurality of candidate recurring time periods; and randomly selecting the first recurring time period from the plurality of candidate recurring time periods. In some aspects, the method also includes determining a duration of the first or second recurring time period based on a network load. In some aspects, the method also includes determining a duration of the first or second recurring time period based on a number of failed MCS0 connection requests by associated stations. In some aspects, the method also includes monitoring communications with the second wireless device after adjustment of the transmission attribute; and further adjusting the transmission attribute based on the monitoring. In some aspects, further adjusting the transmission attribute comprises selecting a third set of multiplexing parameters. In some aspects, a first frequency band indicating by the first set of multiplexing parameters is different than a second frequency band indicated by the third set of multiplexing parameters. In some aspects, the method also includes determining a frequency schedule based on communications with one or more access points, wherein the further adjusting is based on at least the frequency schedule. In some aspects, the frequency schedule indicates one or more of the number of recurring time periods or frequency bands, a size or duration of recurring time periods or frequency bands, a time reference for a set of recurring time periods or frequency bands.

Another aspect disclosed is a method of communicating within a dense wireless network environment. The method includes receiving a first message indicating a first recurring time period, the first recurring time period occurring within a contention period, the message indicating that communication with an access point occurs during the first recurring time period; and communicating with the access point during the first recurring time period based on the message. In some aspects, the method also includes receiving a second message indicating a first frequency range, the second message indicating that communication with the access point occurs within the first frequency range of the first recurring time period, wherein communicating with the access point occurs during the first recurring time period and within the first frequency range based on the second message. In some aspects, the first message and the second message are the same message.

Another aspect disclosed is an apparatus for communicating within a dense wireless network environment. The apparatus includes a receiver configured to receive a first message indicating a first recurring time period, the first recurring time period occurring within a contention period, the message indicating that communication with an access point occurs during the first recurring time period; and a transmitter configured to communicate with the access point during the first recurring time period based on the message. In some aspects, the apparatus also includes a receiver configured to receive a second message indicating a first frequency range, the second message indicating that communication with an access point occurs within the first frequency range of the first recurring time period, wherein the transmitter is further configured to communicate with the access point during the first recurring time period and within the first frequency range based on the second message. In some aspects, the first message and the second message are the same message.

Another aspect disclosed is an apparatus for communicating within a dense wireless network environment. The apparatus includes means for receiving a first message indicating a first recurring time period, the first recurring time period occurring within a contention period, the message indicating that communication with an access point occurs during the first recurring time period; and means for communicating with the access point during the first recurring time period based on the message. In some aspects, the apparatus also includes means for receiving a second message indicating a first frequency range, the second message indicating that communication with an access point occurs within the first frequency range of the first recurring time period, wherein the means for transmitting is further configured to communicate with the access point during the first recurring time period and within the first frequency range based on the second message. In some aspects, the first message and the second message are the same message.

Another aspect disclosed is a computer readable storage medium comprising instructions that when executed cause a processor to perform a method of communicating within a dense wireless network environment. The method includes receiving a first message indicating a first recurring time period, the first recurring time period occurring within a content period, the message indicating that communication with an access point occurs during the first recurring time period; and communicating with the access point during the first recurring time period based on the message. In some aspects, the method further also includes receiving a second message indicating a first frequency range, the second message indicating that communication with an access point occurs within the first frequency range of the first recurring time period, wherein communicating with the access point occurs during the first recurring time period and within the first frequency range. In some aspects, the first message and the second message are the same message.

Another aspect disclosed is a method of determining whether a wireless device is subject to interference. The method includes determining one or more parameters via a device, the parameters comprising a packet error rate, a strength of a signal received from the wireless device, a transmit power of a message received from the wireless device, a metric indicating a wireless device's actual throughput and a wireless device's attempted throughput, a transmission distance to the wireless device; and determining whether the device is subject to interference based on the one or more parameters.

Another aspect disclosed is an apparatus for determining whether a wireless device is subject to interference. The apparatus includes a processor configured to determine one or more parameters via a device, the parameters comprising a packet error rate, a strength of a signal received from the wireless device, a transmit power of a message received from the wireless device, a metric indicating a wireless device's actual throughput and a wireless device's attempted throughput, a transmission distance to the wireless device; and a processor configured to determine whether the device is subject to interference based on the one or more parameters.

Another aspect disclosed is an apparatus for determining whether a wireless device is subject to interference. The apparatus includes means for determining one or more parameters via a device, the parameters comprising a packet error rate, a strength of a signal received from the wireless device, a transmit power of a message received from the wireless device, a metric indicating a wireless device's actual throughput and a wireless device's attempted throughput, a transmission distance to the wireless device; and means for determining whether the device is subject to interference based on the one or more parameters.

Another aspect disclosed is a computer readable storage medium comprising instructions that when executed cause a processor to perform a method of determining whether a wireless device is subject to interference. The method includes determining one or more parameters via a device, the parameters comprising a packet error rate, a strength of a signal received from the wireless device, a transmit power of a message received from the wireless device, a metric indicating a wireless device's actual throughput and a wireless device's attempted throughput, a transmission distance to the wireless device; and determining whether the device is subject to interference based on the one or more parameters.

Another aspect disclosed is a method of dynamically determining multiplexing parameters for communication with a wireless device. The method includes determining a first set of multiplexing parameters based on whether the wireless device is subject to interference; communicating with the wireless device based on the first set of multiplexing parameters, monitoring the communications with the wireless device, the communications based on the first set of multiplexing parameters; determining a second set of multiplexing parameters based on the monitoring; and communicating with the wireless device based on the second set of multiplexing parameters. In some aspects, a first frequency band indicated by the first set of multiplexing parameters is different than a second frequency band indicated by the second set of multiplexing parameters. In some aspects, the method also includes determining a frequency schedule based on communications with one or more access points or controllers, wherein the second set of multiplexing parameters is based on at least the frequency schedule. In some aspects, the frequency schedule indicates one or more of a number of recurring time periods or frequency bands, a size or duration of recurring time periods or frequency bands, a time reference for a set of recurring time periods or frequency bands.

Another aspect disclosed is an apparatus for dynamically determining multiplexing parameters for communication with a wireless device. The apparatus includes a processor configured to determine a first set of multiplexing parameters based on whether the wireless device is subject to interference, a transceiver configured to communicate with the wireless device based on the first set of multiplexing parameters, a processor configured to monitor the communications using the first set of multiplexing parameters with the wireless device; and a transceiver configured to communicate with the wireless device using a second set of multiplexing parameters based on the monitoring. In some aspects, a first frequency band indicated by the first set of multiplexing parameters is different than a second frequency band indicated by the second set of multiplexing parameters. In some aspects, the apparatus also includes a processor configured to determine a frequency schedule based on communications with one or more access points or controllers, wherein the second set of multiplexing parameters is based on at least the frequency schedule. In some aspects, the frequency schedule indicates one or more of a number of recurring time periods or frequency bands, a size or duration of recurring time periods or frequency bands, a time reference for a set of recurring time periods or frequency bands.

Another aspect disclosed is an apparatus for dynamically determining multiplexing parameters for communication with a wireless device. The apparatus includes means for determining a first set of multiplexing parameters based on whether the wireless device is subject to interference, means for communicating with the wireless device based on the first set of multiplexing parameters, means for monitoring the communications using the first set of multiplexing parameters with the wireless device; and means for communicating with the wireless device using a second set of multiplexing parameters based on the monitoring. In some aspects, a first frequency band indicated by the first set of multiplexing parameters is different than a second frequency band indicated by the second set of multiplexing parameters. In some aspects, the apparatus also includes means for determining a frequency schedule based on communications with one or more access points or controllers, wherein the second set of multiplexing parameters is based on at least the frequency schedule. In some aspects, the frequency schedule indicates one or more of a number of recurring time periods or frequency bands, a size or duration of recurring time periods or frequency bands, a time reference for a set of recurring time periods or frequency bands.

Another aspect disclosed is a computer readable storage medium comprising instructions that when executed cause one or more processors to perform a method of dynamically determining multiplexing parameters for communication with a wireless device. The method includes determining a first set of multiplexing parameters based on whether the wireless device is subject to interference, communicating with the wireless device based on the first set of multiplexing parameters, monitoring the communications using the first set of multiplexing parameters with the wireless device; and communicating with the wireless device using a second set of multiplexing parameters based on the monitoring. In some aspects, a first frequency band indicated by the first set of multiplexing parameters is different than a second frequency band indicated by the second set of multiplexing parameters. In some aspects, the method further comprising determining a frequency schedule based on communications with one or more access points or controllers, wherein the second set of multiplexing parameters is based on at least the frequency schedule. In some aspects, the frequency schedule indicates one or more of a number of recurring time periods or frequency bands, a size or duration of recurring time periods or frequency bands, a time reference for a set of recurring time periods or frequency bands.

DETAILED DESCRIPTION

Figure 1:
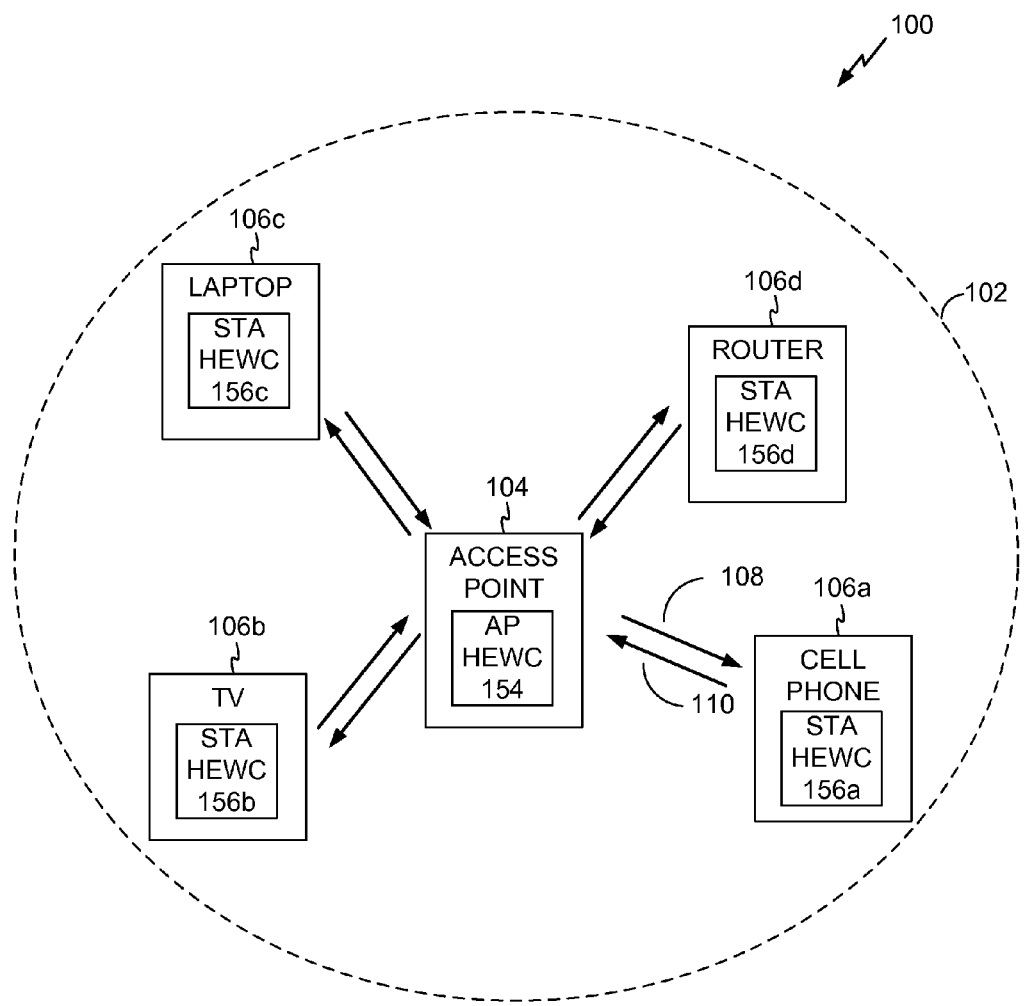
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of some implementations of the AP HEWC 154 is described in greater detail below with respect to FIGS. 2B, 3, 4, and 7B.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of some implementations of the STA HEWC 156 is described in greater detail below with respect to FIGS. 2B, 3, 4, 8B, and 10B.

Figure 2A:
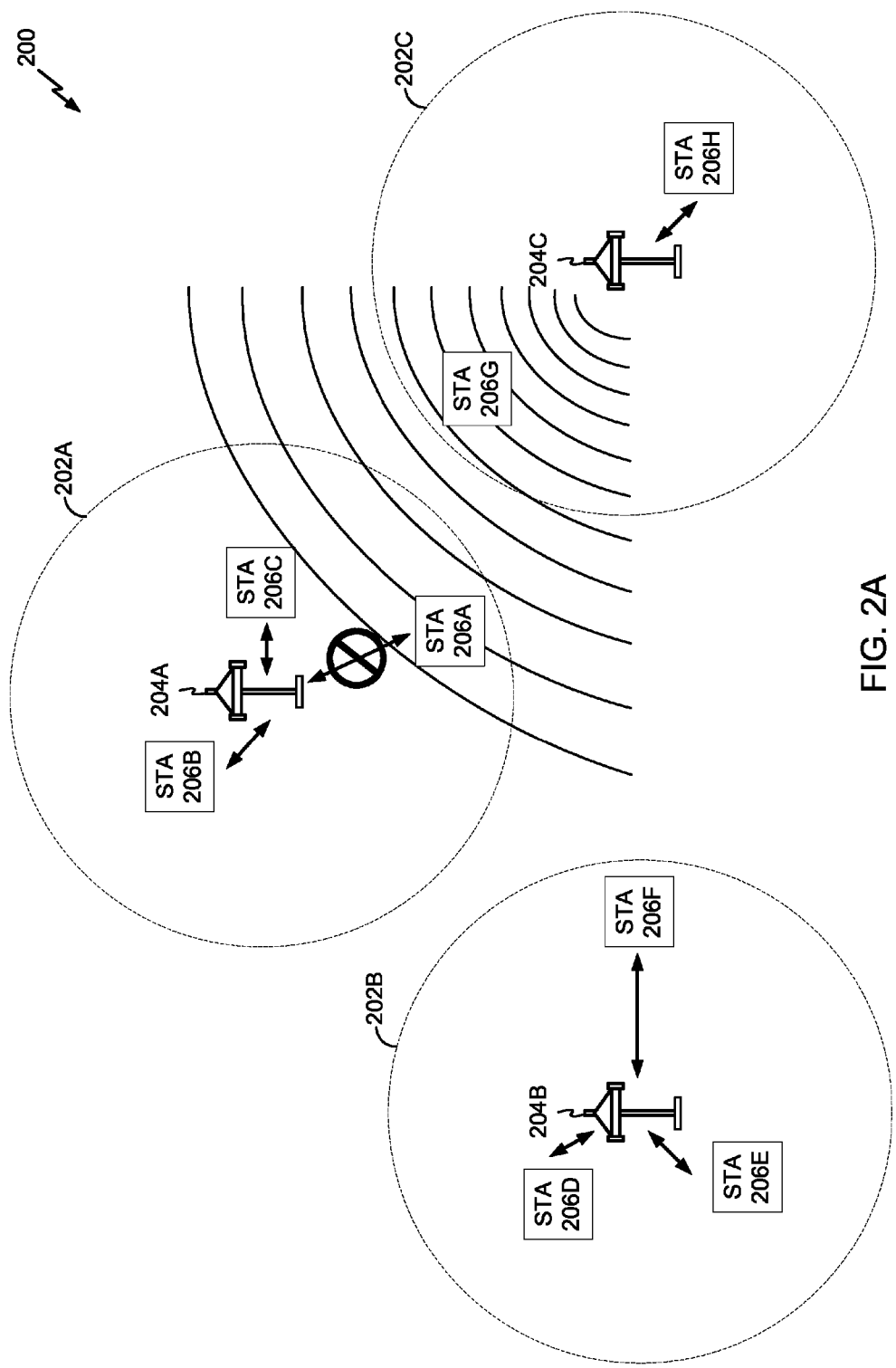
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput.

For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-10B.

Figure 2B:
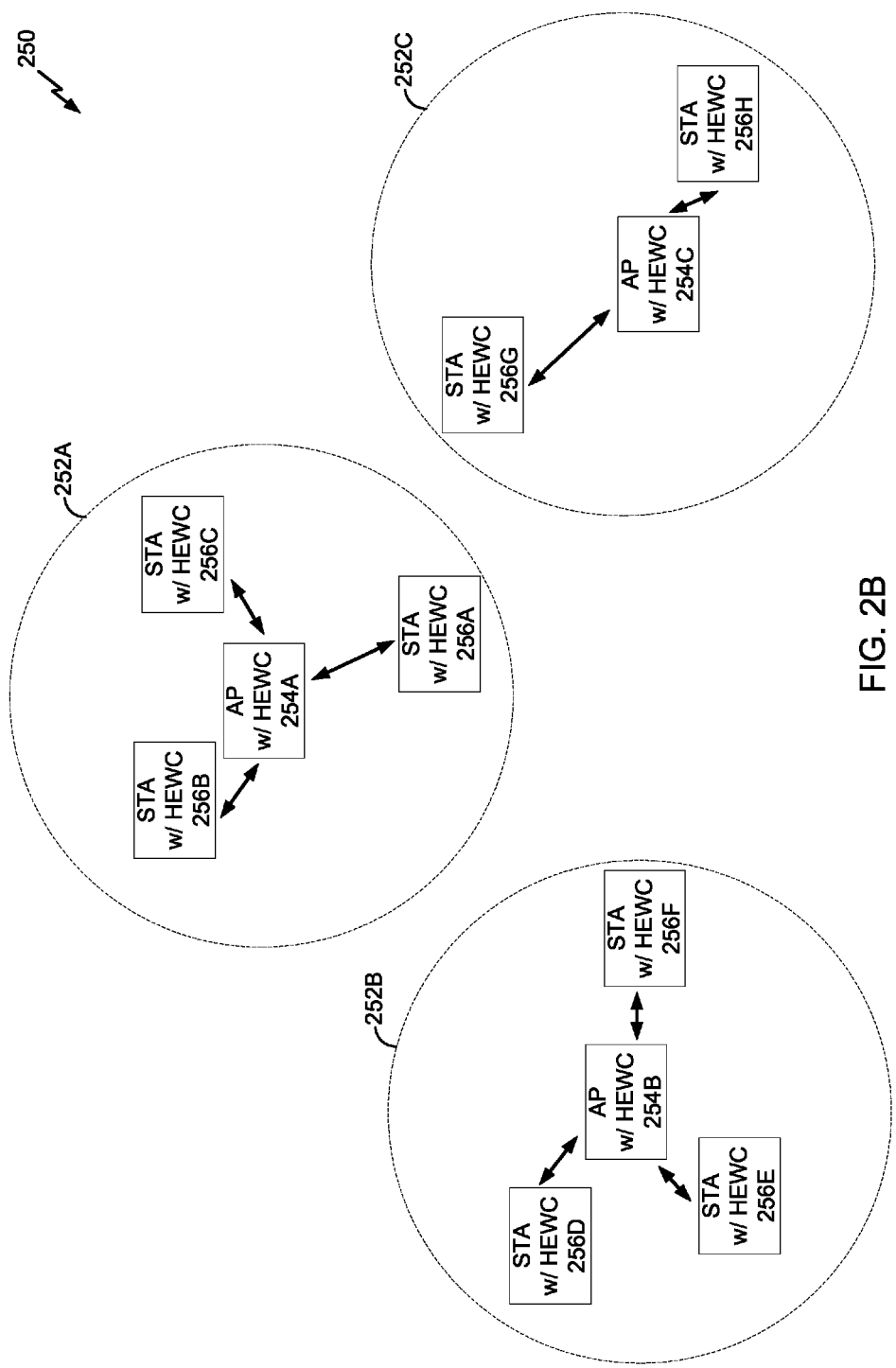
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2B, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
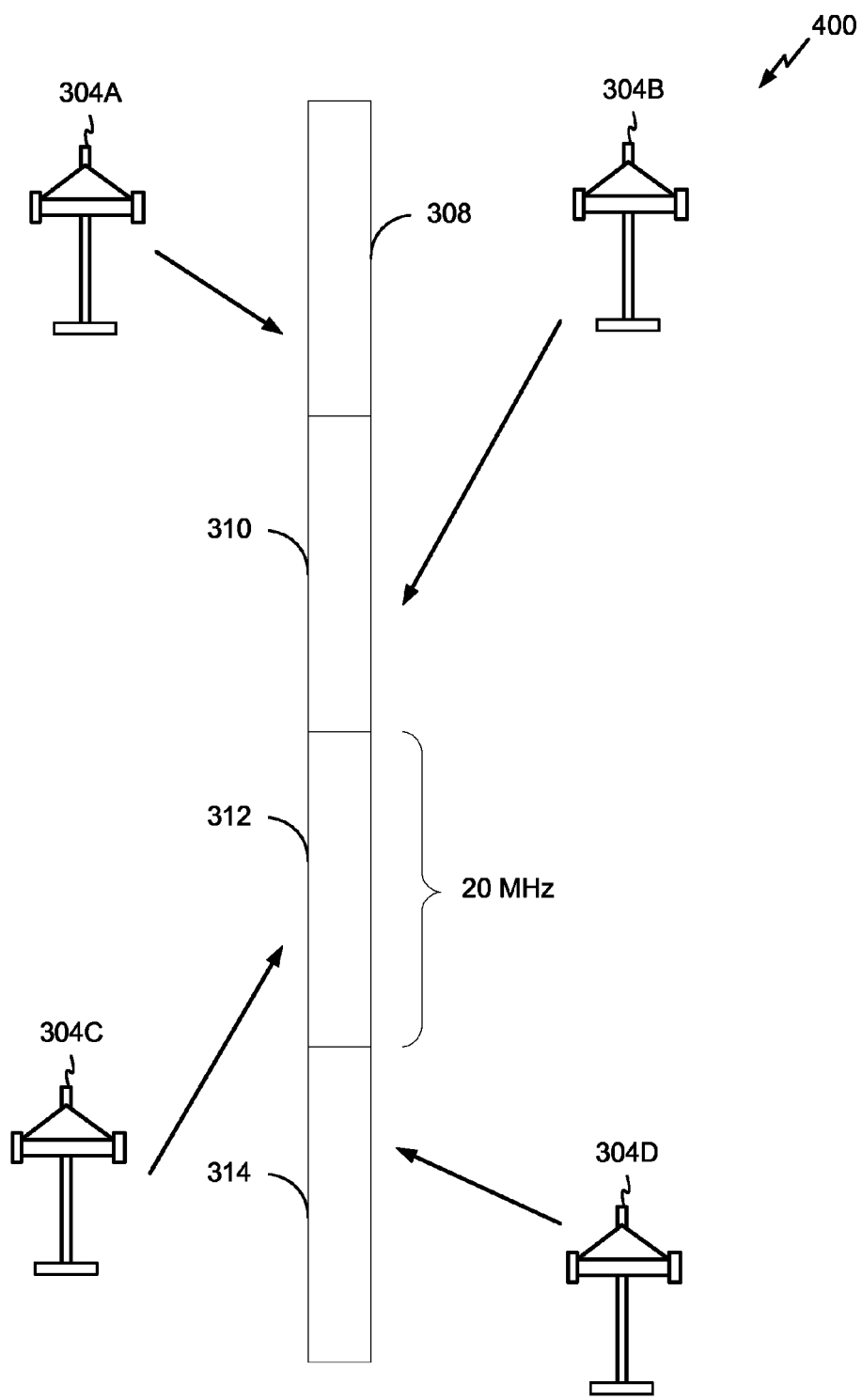
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIGS. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices, that include the high-efficiency wireless component can communicate concurrently with other APs and STAs without interference. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
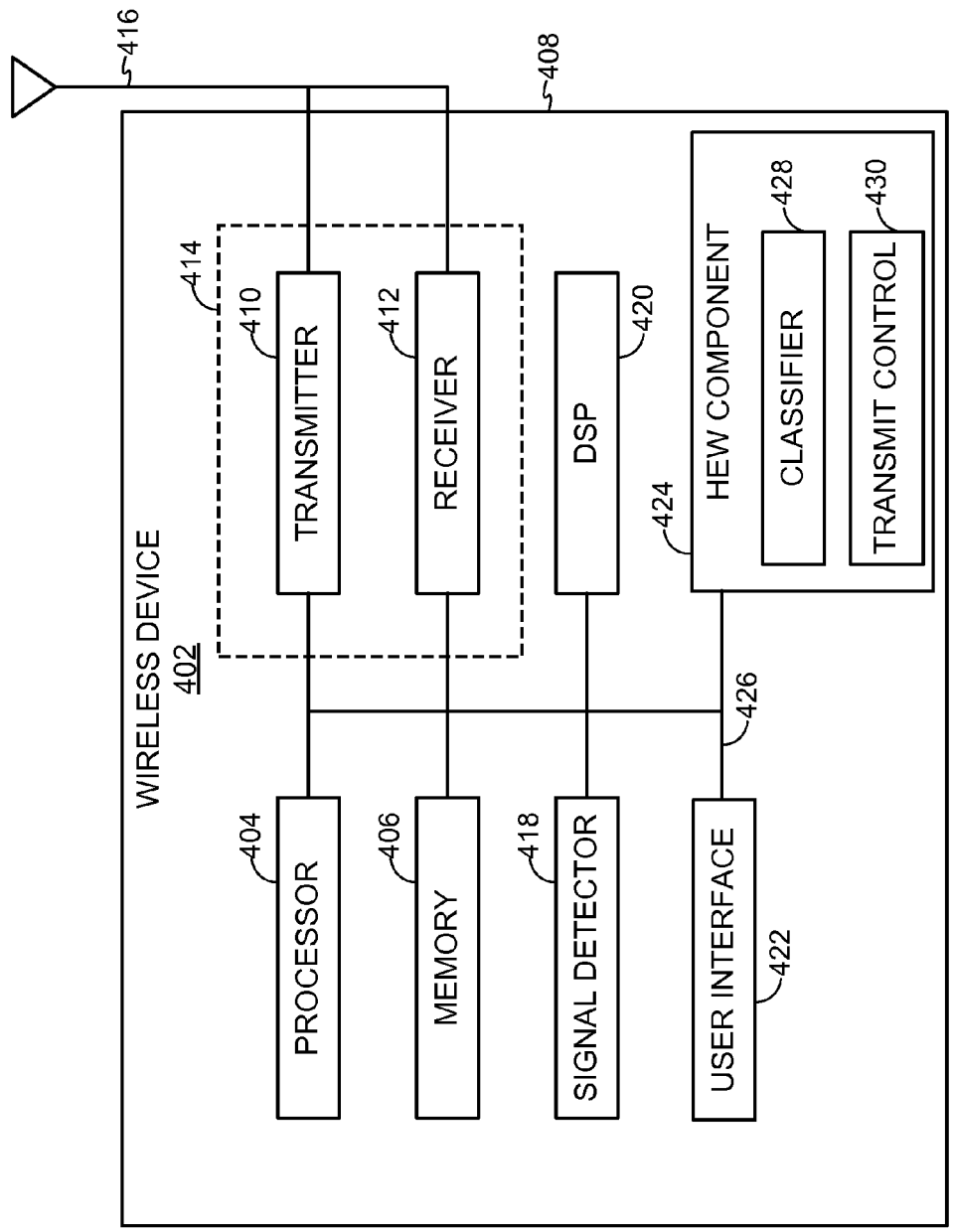
FIG. 4 shows a functional block diagram of an exemplary wireless device that may be employed within the wireless communication systems of FIGS. 1, 2B, and 3.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

Figure 5A:
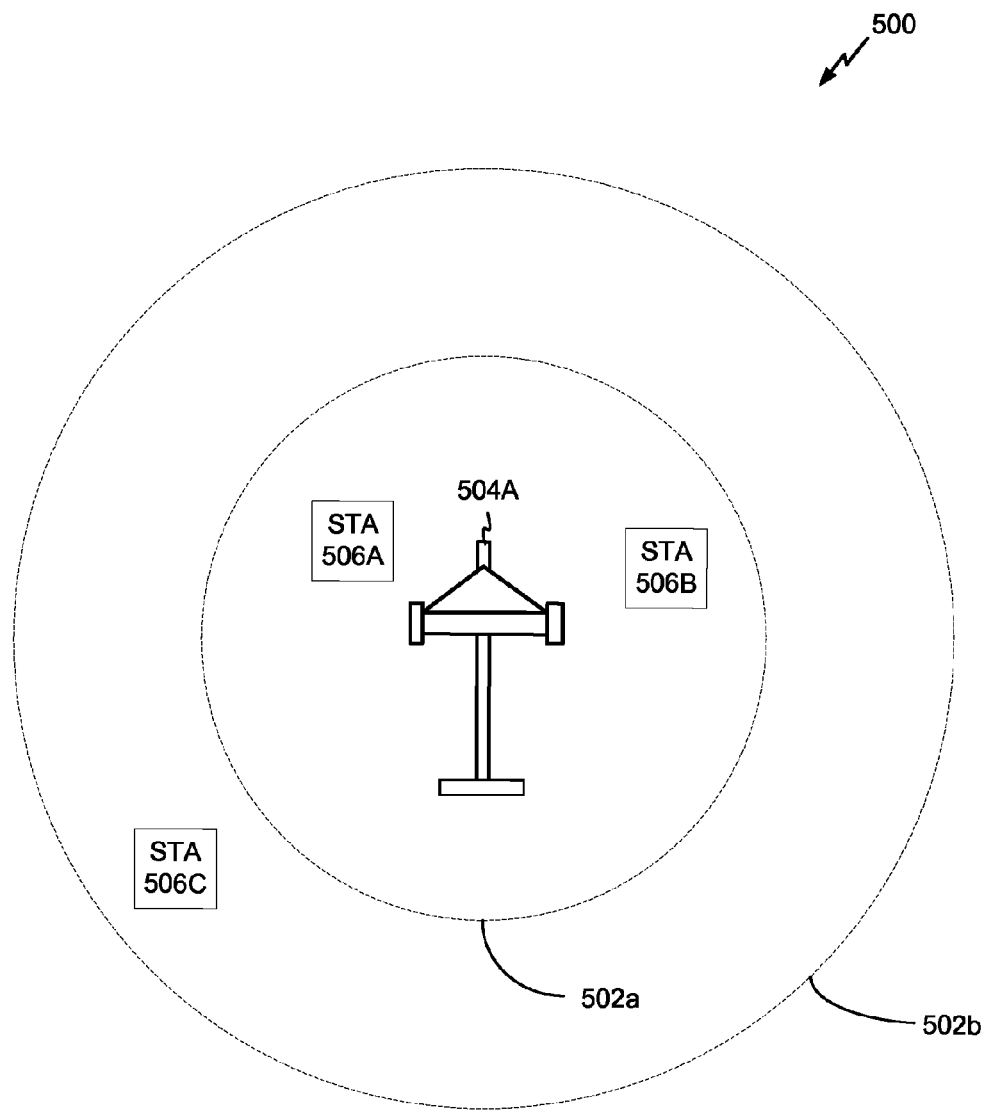
FIG. 5A shows one example implementation of a space division multiplexing method that may be employed within the wireless communication systems of FIGS. 1, 2B, and 3.

FIG. 5A shows one example implementation of a space division multiplexing method 500 that may be employed within the wireless communication systems of FIGS. 1, 2B, and 3. FIG. 5A shows an access point 504A in communication with three stations 506A-C. In some aspects, the AP 504A's communication with the three stations 506A-C may be organized into two multiplexed groups 502a and 502b. For example, multiplexed groups 502a-b may represent two different recurring time slots in a time division multiplexing scheme employed by the AP 504A. In another aspect, multiplexed groups 502a-b may represent two different frequency ranges in a frequency division multiplexing scheme employed by AP 504A. In another aspect, multiplexed groups 502a-b may represent two different frequency ranges within a particular recurring time period when frequency division multiplexing is used within a time division multiplexing scheme employed by the AP 504A.

In another aspect, the multiplexed groups 502A-B may be implemented via the use of beamforming or selective antenna transmission to wireless devices in each of the multiplexed groups.

The AP 504A may determine which of the stations 506A-C belong in each of the multiplexed groups 502a-b based on one or more parameters. In some aspects, stations 506A-C may be grouped based on a susceptibility of communications with these stations to interference. For example, the grouping of stations 506A-C may be based on measurements of network communication between each of the stations 506A-C and AP 504A. In one aspect, stations experiencing a packet error rate greater than a threshold may be placed into group 502a, while stations experiencing a packet error rate lower than a threshold may be placed into group 502b. In some aspects, AP 504A may determine a physical distance between the AP 504A and each of STAs 506A-C. In these aspects, the grouping of stations may be based on the determined physical distances. In some aspects, the grouping of STAs 506A-C may be based on other attributes of a link condition or topology between the AP 504A and the STAs 506A-C. In some aspects, the grouping of STAs 506A-C may be based on indications exchanged between the STAs 506A-C and the AP 504A, and/or indications exchanged between AP 504A and other APs (not shown). The indications between the AP's may be exchanged over the air or via a backhaul link between the APs. In some aspects, the grouping of stations may be based on any combination of the factors discussed above.

Figure 5B:
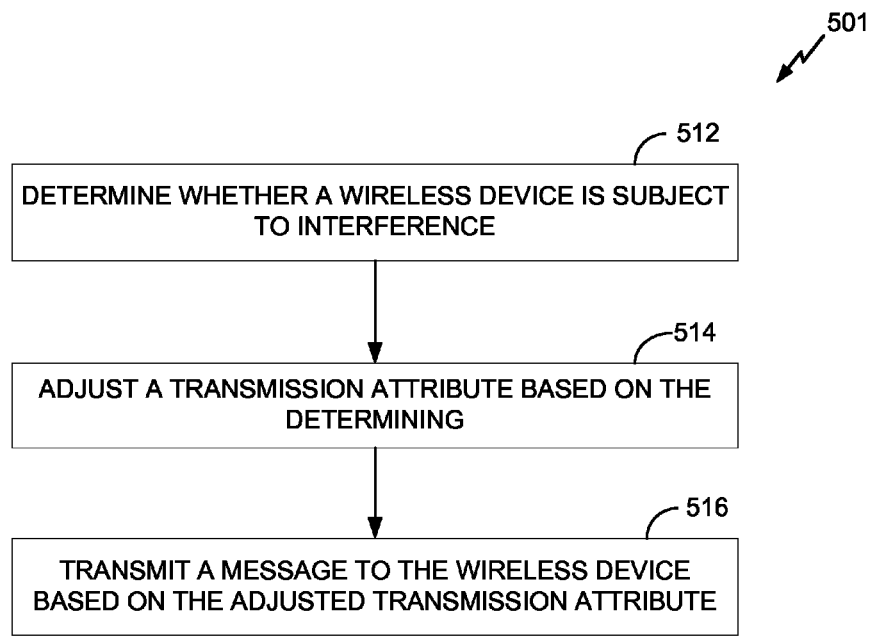
FIG. 5B is a flowchart of a process for transmitting a wireless message from a first wireless device to a second wireless device in a dense wireless environment.

FIG. 5B is a flowchart of a process for transmitting a wireless message from a first wireless device to a second wireless device in a dense wireless environment. In one aspect, a dense wireless environment may include the communications system 250 illustrated in FIG. 2B. In one aspect, the process 501 may be performed by the wireless device 402, illustrated in FIG. 4.

In block 512, a determination is made as to whether a wireless device is subject to interference. In some aspects, the determination may be based on measurements performed during operation of the network. For example, in some aspects, if a wireless device has a packet error rate greater than an error threshold, the wireless device may be determined to be subject to interference. If communication with the wireless device has a packet error rate less than an error threshold, the wireless device may be determined to not be subject to interference.

In another aspect, the determination may be based on one or more attributes of the communication path between a transmitter and the wireless device. For example, a link condition or topology between the transmitter and the wireless device may be considered as part of the determination. In some aspects, a physical distance between the transmitter and the wireless device may be determined. In some aspects, the physical distance may be determined based on the physical position of the wireless device and the physical position of the transmitter, such as an access point. In some other aspects, the physical distance may be inferred by other information, such as a transmission signal strength of the wireless device when received by an access point. In these aspects, whether a wireless device is subject to interference may be based on the physical distance between the transmitter and receiver. For example, if the physical distance is greater than a distance threshold, the device may be determined to be subject to interference. Similarly, if the device is less than a threshold distance from the transmitter, it may be determined to not be subject to interference.

In some aspects, whether the wireless device is subject to interference may be based on indications exchanged between one or more stations and an access point. For example, in one aspect, a station may report signal strength measurements, such as received signal strength indications (RSSI) indications or the like, of other stations and/or other access points to an associated access point. The associated access point may then determine whether the station is subject to interference based on the reported measurements. In some aspects, one or more of these indications may be received by the access point in one or more wireless messages. In some aspects, one or more of these indications may be received via a wired network connection, such as a backhaul network connection.

In block 514, a transmission attribute is adjusted based on the determination of whether the wireless device is subject to interference. For example, in one aspect, communication with devices subject to interference may be performed in a first recurring time period and/or frequency range while communication with devices not subject to interference may be performed in a second recurring time period and/or frequency range. In some aspects, communication with devices subject to interference may be performed using a first set of beamforming parameters or antennas, while communication with devices not subject to interference is performed using a second set of beamforming parameters or antennas. In some aspects, combination of TDM, FDM, and Spatial Multiplexing parameters may be used to distinguish communication between devices subject to interference and devices not subject to interference.

In a network that utilizes carrier sense media access (CSMA), CSMA may be used when transmitting a message to the wireless device. If the wireless device is not subject to interference, no adjustment to a transmission attribute may be performed. In other words, in some aspects, a default or standard set of CSMA transmission attributes may be used when transmitting a message to the wireless device. In some other aspects, advanced deferral rules not in conformance with CSMA standards may be followed.

When one or more of spatial multiplexing, time division multiplexing, or frequency division multiplexing is used to communicate with the wireless device, in some aspects, standard CSMA deferral rules may be employed to provide media access within a recurring time period, or frequency range for example. In some other aspects, advanced deferral rules not in conformance with known CSMA standards may be used to facilitate media access within a recurring time period or frequency range for example.

In block 516, a message is transmitted to the wireless device based on the adjusted transmission attribute.

Figure 5C:
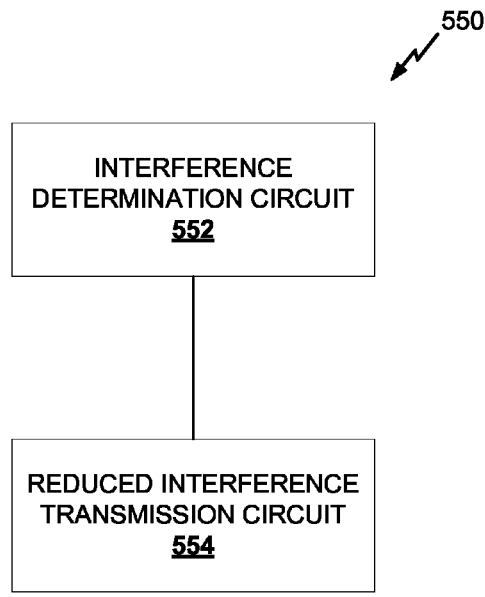
FIG. 5C shows a functional block diagram for a wireless communication apparatus that may be employed within the wireless communication systems of FIGS. 1, 2B, and 3.

FIG. 5C shows a functional block diagram for a wireless communication apparatus. Those skilled in the art will appreciate that a wireless communication apparatus may have more components than the simplified wireless communication apparatus 402 shown in FIG. 4. The wireless communication apparatus 550 shown includes only those components useful for describing some prominent features of implementations within the scope of the claims. The wireless communication apparatus 550 may include an interference determination circuit 552 and/or a reduced interference transmission circuit 554.

In some implementations, the interference determination circuit 552 may be configured to perform one or more of the functions discussed above with respect to block 512. The interference determination circuit 552 may include one or more of a programmable chip, a processor, a memory, and a network interface. For example, the interference determination circuit may include the processor 404. In some implementations, a means for determining whether a wireless device is subject to interference may include the interference determination circuit 552.

In some implementations, the reduced interference transmission circuit 554 may be configured to perform one or more functions discussed above with respect to blocks 514 and/or 516. The reduced interference transmission circuit 554 may include one or more of a programmable chip, a processor, a memory, and a network interface. For example, the reduced interference transmission circuit 554 may include the transmitter 410. In some implementations, a means for transmitting a message to a wireless device based on adjusted transmission attributes may include the reduced interference transmission circuit 554. In some aspects, a means for adjusting a transmission attribute based on a determination of whether a wireless device is subject to interference may include the reduced interference transmission circuit 554.

Figure 6A:
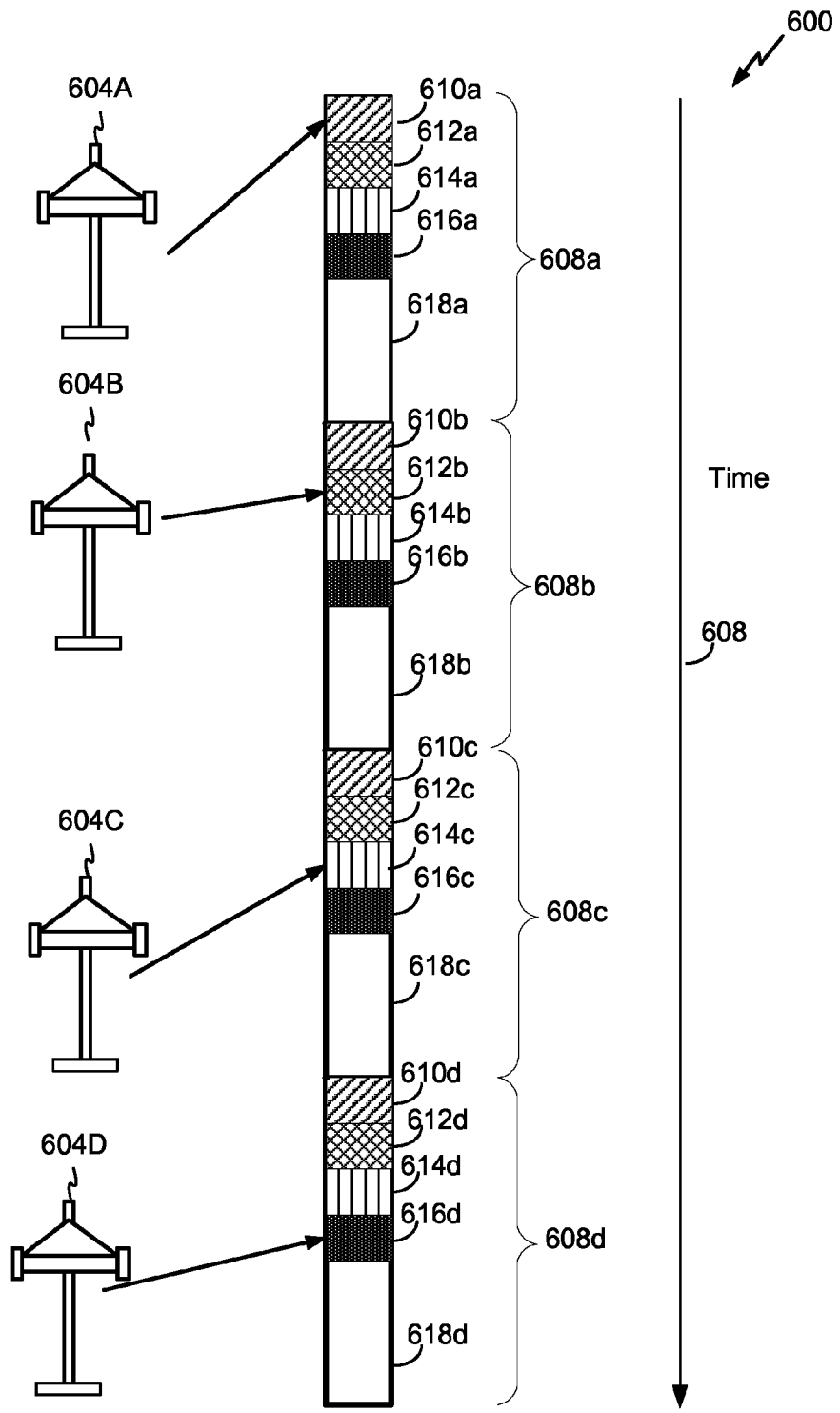
FIG. 6A shows one example implementation of a time division multiplexing method that may be employed within the wireless communication systems of FIGS. 1, 2B, and 3.

FIG. 6A shows one example implementation of a time division multiplexing method that may be employed within the wireless communication system 250 of FIG. 2B. FIG. 6A illustrates time 608 in the vertical dimension. A portion of time 608 is shown segmented into time periods 608*a-d*. Each time period 608*a-d* is further divided into another series of recurring time periods. For example, time segment 608*a* is divided into time segments 610*a*, 612*a*, 614*a*, 616*a*, and 618*a*. Similarly time segment 608*b* is divided into time segments 610*b*, 612*b*, 614*b*, 616*b*, and 618*b*. In the illustrated example, the division for time periods 608*a-d* follows a repeating pattern, such that the allocation of time within each of time periods 608*a-d* is similar or represents a recurring pattern. For example, each of time periods 608*a-d* is divided into time periods 610, 612, 614, 616, and 618, with each corresponding period across time periods 608*a-d* in the same order and of the same duration.

FIG. 6A also illustrates four access points, 604A-D. In some aspects, any of access points 604A-D may generate transmissions that potentially interfere with communications by one of the other access points. For example, a transmission from access point 604A to a first mobile device may potentially interfere with communications between access point 604B and a second mobile device.

Each time period 608*a-d* is divided into recurring time periods 610*a-d*, 612*a-d*, 614*a-d*, 616*a-d*, and 618*a-d*. In some aspects, some access points and/or mobile devices may be inhibited from transmitting during one or more of these recurring time periods. For example, in some aspects, the access points 604A-D may coordinate between themselves to determine which access points may transmit or perform communications during each of recurring time periods 610*a-d*, 612*a-d*, 614*a-d*, 616*a-d*, and 618*a-d*. In some other aspects, each access point 604A-D may determine which of recurring time periods 610*a-d*, 612*a-d*, 614*a-d*, 616*a-d*, and 618*a-d* it will use for communications without exchanging information with another access point. This determination may be made, in some aspects, based on indications from one or more stations and/or based on network statistics collected by each access point. In some aspects, each access point may randomly choose one or more of each of recurring time periods 610*a-d*, 612*a-d*, 614*a-d*, 616*a-d*, and 618*a-d* for communications.

In some aspects, one or more recurring time periods may be reserved for use by all of the access points and/or mobile devices. In one aspect, access points 604A-D may exchange wireless messages freely with one or more wireless devices during recurring time period 618*a-d*. During time period 618, devices may continue to utilize carrier sense media access and collision detection to perform communications with other wireless devices. As multiple access points and mobile devices in communications with those access points may transmit during the recurring time period 618*a-d*, transmissions during this recurring time period may be more susceptible to interference. A mobile device receiving a message from a first access point during recurring time period 618*a-d* may be interfered with by a transmission from a second access point. Similarly, a mobile device transmitting to a first access point during recurring time period 618*a-d* may be interfered with by transmissions from either a second access point or a second mobile device. Whether a mobile device is subject to interference during recurring time period 618*a-d* may be based on one or more of its transmission power, its physical location relative to an access point with which it is in communication, its physical location relative to another access point with which it is not communicating, or a combination of these and other factors.

In some aspects, one or more recurring time periods may be reserved for exclusive use of an access point. In some aspects, an access point may not have exclusive use of the one or more recurring time periods, but the number of access points using these particular recurring time periods may be reduced relative to some other recurring time periods. Therefore, these one or more recurring time periods may present a reduced risk of interference than some other recurring time periods where more access points and/or mobile devices are transmitting. For example, as shown in FIG. 6A, each of access points 604A-D has been assigned a different recurring time period 610, 612, 614, and 616. For example, as shown, access point 604A has been assigned recurring time period 610 for communications. In one aspect, none of access points 604B-D may communicate during time period 610. In some other aspects, only a subset of access points 604B-D may communicate during time period 610. Access point 604B has been assigned recurring time period 612 for communications. In one aspect, none of access points 604A or 604C-D may communicate during time period 612. In some other aspects, only a subset of access points 604A and 604C-D may communicate during time period 612.

The access point may reserve these time periods for communications with one or more subsets of mobile devices with which the access point is communicating or associated. For example, in some aspects, an access point may exchange messages with a first group of mobile devices during one recurring time period and with a second group of mobile devices during a second recurring time period. In some aspects, the first recurring time period may be used by multiple access points for communication while the second recurring time period is reserved for use by a reduced number of access points.

In some aspects, the first group of mobile devices may overlap with the second group of mobile devices, while in other aspects, the groups may not overlap. For example, in some aspects, an access point may group mobile devices that have been determined not to be subject to interference into a first group. Mobile devices subject to interference may be placed in a second group. Because the first group is not subject to interference, communication may be maintained with the first group when a larger number of other access points and mobile devices are also transmitting. In one example discussed above, the first group may communicate with the access point during recurring time period 618*a-d*, since in this example, other access points and stations may transmit freely during recurring time period 618*a-d*. The access point may communicate with the second group of mobile devices during a separate time period, for example, time period 612*a-d*, as shown for access point 604B in FIG. 6A. In some aspects, fewer access points and/or mobile devices may be communicating in recurring time period 612*a-d* than in recurring time period 618*a-d*.

Figure 6B:
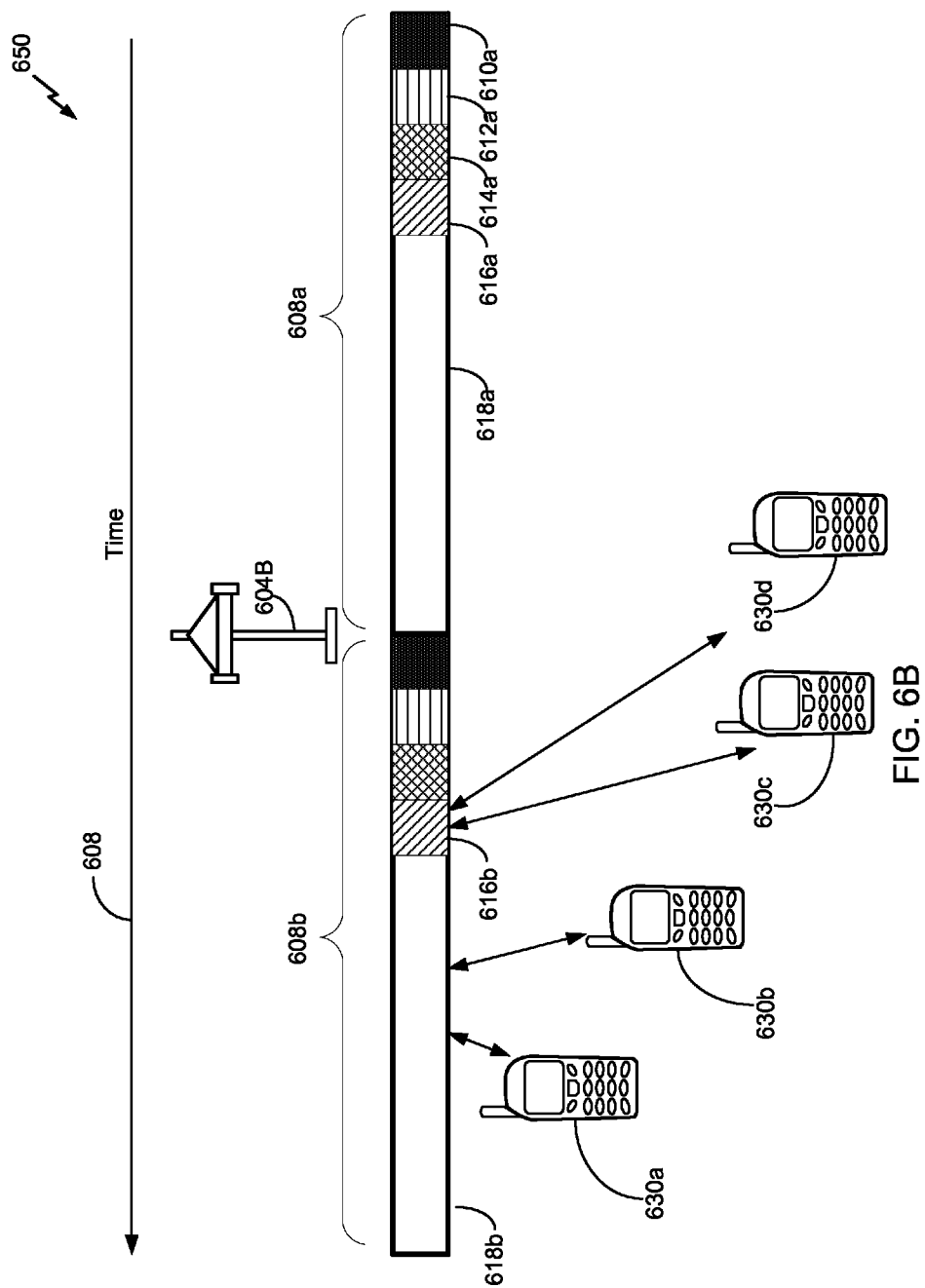
FIG. 6B shows an example of the use of time division multiplexing to communicate on a dense wireless network.

FIG. 6B shows an example of the use of time division multiplexing to communicate on a dense wireless network Time is shown horizontally in FIG. 6B. FIG. 6B shows time 608 divided into two time periods 608*a-b* from FIG. 6A. Each of time periods 608*a-b* is subdivided into recurring time periods 610-618 as also shown in FIG. 6A. Not all of the divisions of time period 608*b* are labeled to preserve the clarity of FIG. 6B.

FIG. 6B shows that the access point 604B has grouped the wireless devices 630*a-d* into two groups, one group including wireless devices 630*a-b*, and another group including wireless devices 630*c-d*. In some aspects, access point 604B may have determined that wireless devices 630*a-b* are not subject to interference, while wireless devices 630*c-d* are subject to interference. In some aspects, the physical distance from AP 604 to wireless devices 630*a-d* may be determinative as to whether the devices 630*a-d* are subject to interference. In some other aspects, each of mobile devices 630*a-d* proximity to an interference source, such as another access point (not shown) may be determinative or at least affect whether the devices 630*a-d* are subject to interference.

FIG. 6B illustrates that access point 604B communicates with wireless devices 630*a-b* during recurring time period 618. Access point 604B communicates with wireless devices 630*c-d* during recurring time period 616. In some aspects, other access points and wireless devices (not shown) may also communicate during recurring time period 618, while in recurring time period 616, fewer access points and/or wireless device transmit during recurring time period 616 (relative to recurring time period 618). In some aspects, recurring time period 616 may be reserved for exclusive use of access point 604B. In some aspects, because there are fewer potentially interfering sources communicating during recurring time period 616, communications with wireless devices 630*c-d* may be improved as compared to if communication with those devices occurred during recurring time period 618.

In some aspects, access point 604B may provide time references indicating one or more of the recurring time periods discussed above, and/or communication rules associated with the indicated time periods, to wireless devices 630*a-d*, or other mobile devices that wish to communicate with access point 604B. In some aspects, the transmitted message may be multicast or broadcast. In some aspects, this signaling may be performed by a beacon signal transmitted by the access point.

In these aspects, the wireless devices may, based on these indications, perform communications with their respective access points during one or more of the indicated time periods. For example, access point 604B may indicate that wireless devices may freely communicate with it during recurring time period 618. In one aspect, access point 604B may further indicate no wireless devices should communicate with it during time recurring time periods 610, 612, or 614. An access point may further indicate that communication with it during recurring time period 616 requires explicit authorization by the access point. In some aspects, the access point may initiate this authorization if it determines the mobile device is subject to interference. In some aspects, an access point may restrict mobile devices subject to interference to one or more of the recurring time periods 610, 612, 614, 616, and 618. For example, devices subject to interference may be restricted so as to communicate with the access point during a recurring time period used for devices subject to interference, or used for communications with that particular access point (when other access points and/or their associated mobile devices may be inhibited from transmitting).

Figure 6C:
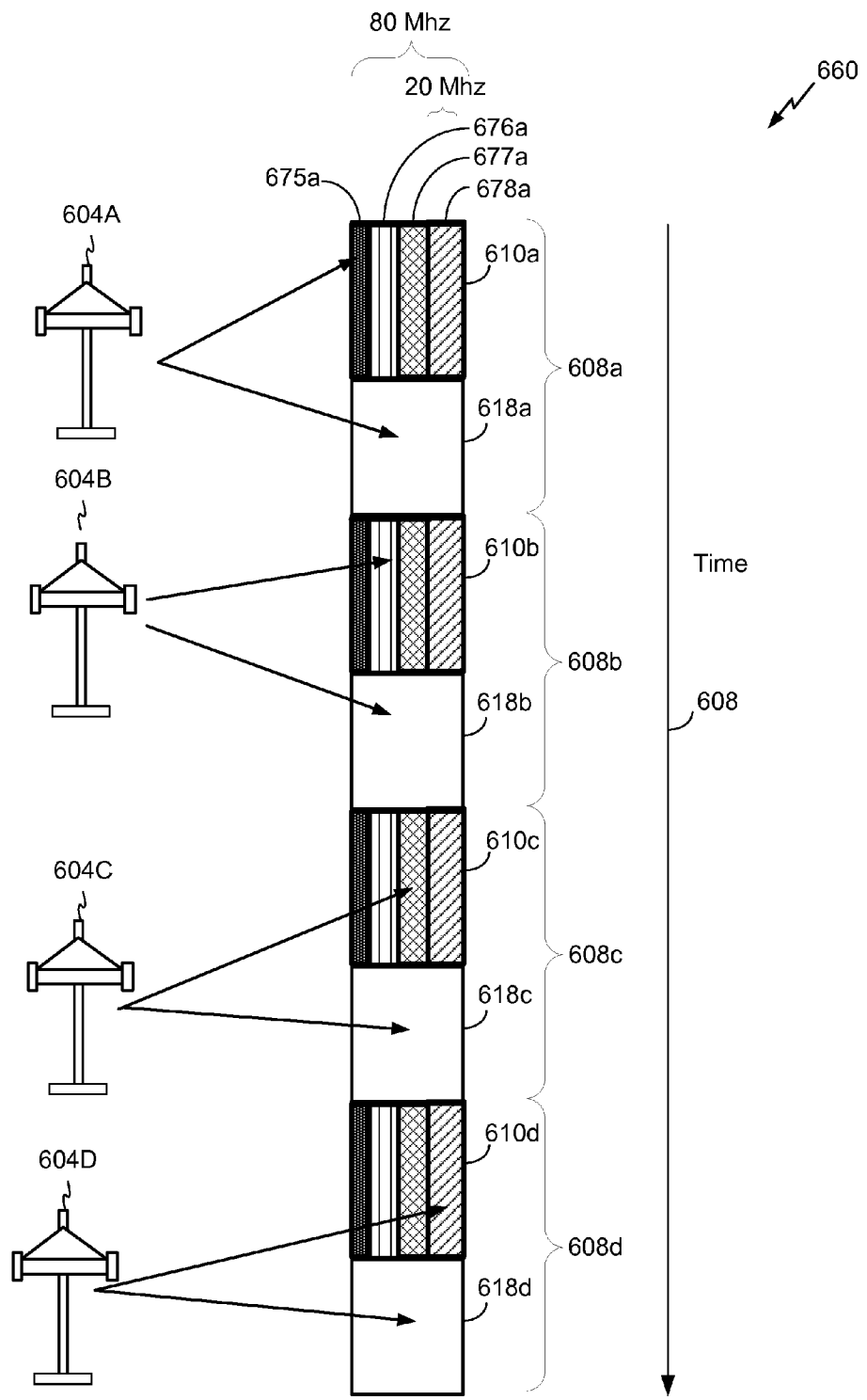
FIG. 6C shows one example implementation of a time division multiplexing method that may be employed within the wireless communication systems of FIGS. 1, 2B, and 3.

FIG. 6C shows one example implementation of a time division multiplexing method that may be employed within the wireless communication system 250 of FIG. 2B. As was shown in FIG. 6A, FIG. 6C also illustrates time 608 in the vertical dimension. In FIG. 6C, the recurring time periods 608*a-d* are further segmented into only two time periods each, 610*a-d* and 618*a-d*. Other aspects may segment recurring time periods 608*a-d* into more than two additional time periods. In the illustrated aspect, each of access points 604A-D may communicate during recurring time periods 618*a-d*. In some other aspects, a subset of the access points may communicate during recurring time periods 618*a-d*. In some aspects, the access points 604A-D may use carrier sense media access to manage concurrent communication within recurring time periods 618*a-d*.

Recurring time periods 610*a-d* are divided into four frequency bands, 675, 676, 677, and 678. In the illustrated example, recurring time periods 608*a-d* may comprise an 80 Mhz frequency band, with each of frequency bands 675, 676, 677, and 678 comprising 20 Mhz within the 80 Mhz range. In the example shown in FIG. 6C, each of access points 604A-D communicates during recurring time period 610*a-d* in a different frequency band. For example, access point 604*a* is shown communicating in frequency band 675, while access point 604*d* is shown communicating in frequency band 678. In some aspects, multiple access points may communicate within one of frequency bands 675-678. In at least some of these aspects, fewer access points communicate within one or more of frequency bands 675-678 of recurring time period 610 than may communicate within the example 80 Mhz frequency band of recurring time periods 618*a-d*. Because fewer access points may be communicating within one or more of frequency bands 675-678 of recurring time period 610, wireless devices subject to interference may experience improved communication when communicating within these frequency bands during time period 610 as compared to communication within time period 618.

In some aspects, an access point may determine which one or more frequency bands of recurring time periods 610*a-d* to communicate in based on communication with one or more other access points. In some aspects, an access point may determine a frequency band or range to communicate in based on indications from stations or other network statistics. In these aspects, an access point may not communicate with another access point to determine a frequency band in which to communicate.

In some aspects, a particular frequency band or range of recurring time period 610 may be randomly chosen by an access point for communication. Within each of frequency bands 675-678, an access point may utilize carrier sense media access to manage concurrent communication within a frequency band. In some aspects, an access point may exchange signals with one or more associated or non-associated stations to indicate a frequency band the stations should use to communicate with the access point during recurring time periods 610*a-d*.

Figure 7A:
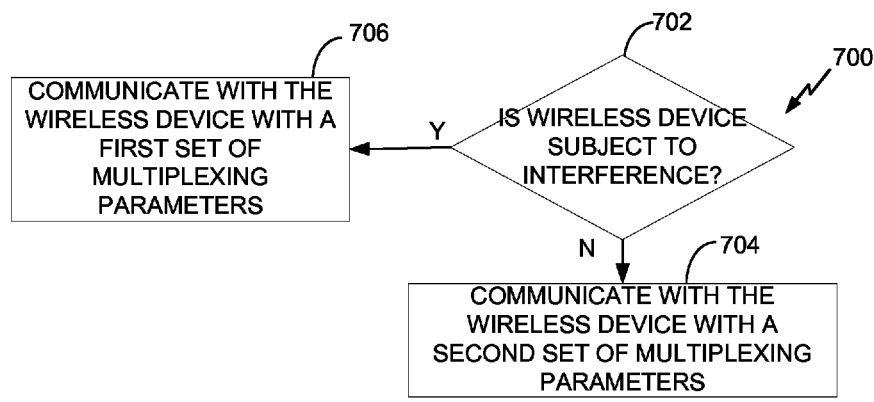
FIG. 7A is a flowchart of a process for transmitting a wireless message from a first wireless device to a second wireless device in a dense wireless environment.

FIG. 7A is a flowchart of a process for transmitting a wireless message from a first wireless device to a second wireless device in a dense wireless environment. In one aspect, a dense wireless environment may include the communications system 250 illustrated in FIG. 2B. In one aspect, the process 700 may be performed by the wireless device 402, illustrated in FIG. 4. In one aspect, process 700 may be performed by an access point.

Block 702 determines whether a wireless device is subject to interference. Block 702 may operate substantially in accordance with block 502 discussed above. If the wireless device is subject to interference, block 706 communicates with the wireless device using a first set of multiplexing parameters. If the wireless device is not subject to interference, block 704 communicates with the wireless device using a second set of multiplexing parameters. The multiplexing parameters may control one or more of spatial multiplexing, such as that provided by beamforming or the use of selective antennas, frequency division multiplexing, time division multiplexing, or a combination of spatial multiplexing, time division multiplexing, and frequency division multiplexing. For example, the first set of multiplexing parameters may define a first recurring time period, frequency range, and/or beamforming parameters. Similarly, the second set of multiplexing parameters may also define a second recurring time period, frequency range, and/or beamforming parameters.

In some aspects, the first set of multiplexing parameters, such as a time period within a TDM scheme or a frequency range within a FDM scheme, and the second set of multiplexing parameters may provide different communication environments. As discussed above, in some aspects, the first set of multiplexing parameters may provide for a reduced risk of interfering transmissions relative to the second set of multiplexing parameters, as fewer devices may be communicating with the first set of multiplexing parameters than with the second set of multiplexing parameters.

Similarly, a length of the first time period may be different or equivalent to a length of the second time period. A longer recurring time period may provide for improved communication relative to a shorter recurring time period in some aspects. For example, an access point may communicate with a first group of devices that are subject to interference in a longer recurring time period, as this time period may provide a reduced probability of the devices experiencing interfering transmissions. The access point may communicate with a second group of devices not subject to interference in a shorter recurring time period. While the shorter recurring time period may expose this second group of devices to more interference relative to the longer recurring time period, communication with the second group of devices may be more tolerant of interference should it occur.

Selection of the first set and/or second set of multiplexing parameters may be based on a plurality of factors which may vary across implementations. In some aspects, selection of the first set and/or second set of multiplexing parameters may be based, at least in part, on one or more messages received from an access point. For example, in some aspects, access points may communicate with each other to allocate particular sets of multiplexing parameters for use in communication by particular access point(s).

In some aspects, the first and second sets of multiplexing parameters define first and second recurring time periods and/or frequency ranges respectively. In some of these aspects, the first and/or second recurring time periods or frequency ranges are determined randomly from a plurality of recurring time periods or frequency ranges. In one aspect, the plurality of recurring time periods and/or frequency ranges may be determined based, at least in part, on one or more messages received from an access point. For example, a group of access points may communicate to determine a set of recurring time periods or frequency ranges will be used for communications with devices subject to interference. The set of recurring time periods and/or frequency ranges may be agreed to and communicated among the group of access points. Each access point may then randomly select one or more time periods and/or frequency ranges from the set when communicating with devices determined to be subject to interference. The random selection of time periods or frequency ranges in this embodiment may simplify communications between access points used to coordinate transmissions, while still providing a reasonable distribution of communications across the time periods or frequency ranges for a set for devices subject to interference.

As mentioned, in some aspects, the first and second sets of multiplexing parameters define first and second recurring time periods and/or frequency ranges. In one aspect, selection of the first and/or second set of multiplexing parameters may be based on a number of access points communicating within each time period or frequency range. For example, in some aspects, a number of access points communicating using a particular set of multiplexing parameters may be determined in process 700. Process 700 may then prioritize the sets of multiplexing parameters for use in communications based on the number of access points communicating using each multiplexing parameter set. For example, process 700 may determine whether an unrestricted number of access points communicate using the first set of multiplexing parameters, or if only a limited set of access points may communicate using the first set of multiplexing parameters. In some aspects, process 700 may determine that one access point has exclusive use of the first set of multiplexing parameters for communication.

In some aspects, an access point may select a set of multiplexing parameters that has a "small" number of access points communicating with it. The access point may use this set of parameters to communicate with devices subject to interference. A "small" number of access points may be a number below a threshold. In some aspects, a second set of multiplexing parameters that has a larger number of access points communicating with it may be selected to communicate with devices not subject to interference. For example, if the number of access points communicating within a time period or frequency range is above a first threshold and below a second threshold, that frequency range or recurring time period may be selected for use in communication with devices not subject to interference.

Figure 7B:
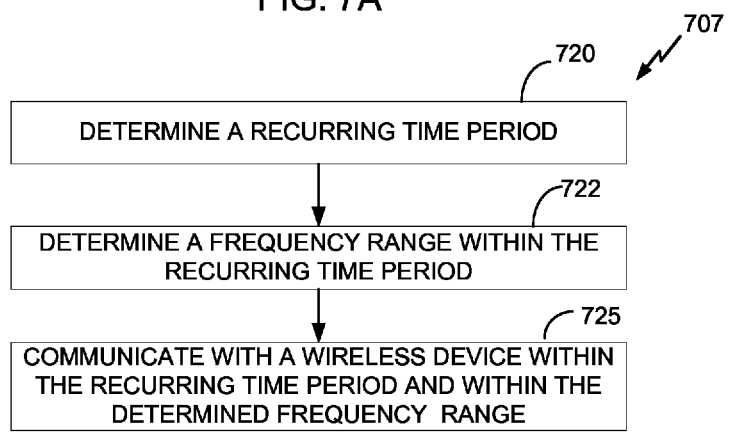
FIG. 7B is a flowchart of a process for transmitting a wireless message from a first wireless device to a second wireless device in a dense wireless environment.

FIG. 7B is a flowchart of a process for communicating with a wireless device during a recurring time period. In one aspect, process 707 may be performed as part of process 700, discussed with respect to FIG. 7A. Specifically, process 707 may be performed by one aspect of blocks 704 and/or 706 of process 700. Some aspects, of blocks 704 and 706 of process 700 may not perform process 707. In one aspect, the process 707 may be performed by the wireless device 402, illustrated in FIG. 4. In one aspect, process 707 may be performed by an access point.

In block 720, a recurring time period is determined. As discussed above, a recurring time period may be determined using a variety of methods that may vary by implementation, but may include determining the time period based on communication with an access point or controller, or by randomly selecting the time period from a pool of candidate time periods. In some aspects, the recurring time period may be defined by the first or second set of multiplexing parameters discussed above with respect to blocks 704 or 706 of process 700.

In block 722, a frequency range within the recurring time period is determined. The frequency range determined in block 722 may, in some aspects, be defined by the first set of multiplexing parameters or the second set of multiplexing parameters discussed above with respect to blocks 704 or 706.

The frequency range may be a portion of the frequency range used for communication on a wireless network. For example, as shown in FIG. 6C, a wireless network may generally utilize an 80 Mhz frequency range when performing wireless communications. Block 722 may select a subset of that frequency range for communications. For example, block 722 may select a frequency range of 10, 20, or 40 Mhz within the 80 Mhz range typically used for wireless communication. In some aspects, the frequency range is determined based on communication with an access point. As mentioned above, access points may exchange one or more messages to coordinate assignment of frequency ranges across the access points, to provide distribution of communications traffic across the frequency ranges.

In some aspects, the frequency range may be randomly selected from a plurality of candidate frequency ranges, with the candidate frequency ranges being determined by the access point communication discussed above. In some aspects the plurality of candidate frequency ranges may be determined based on communication with one or more access points.

In some aspects, fewer access points and/or mobile devices within a dense wireless environment may communicate within the determined frequency range than within a standard frequency range utilized for wireless communications. For example, fewer access points and/or stations may communicate within a 20 Mhz frequency range, for example any of frequency ranges 675-678 illustrated in FIG. 6C, than communicate within an 80 Mhz frequency range, for example, the 80 Mhz frequency range utilized for communication within recurring time period 618*a-d* of FIG. 6C. In some aspects, wireless devices subject to interference may experience improved communications when communicating within the determined frequency range.

In some aspects, the time period determined in block 720, and/or the frequency range determined in block 722 may be determined based on whether devices that will be communicated with during the determined time period and/or frequency range are subject to interference. If the devices are subject to interference, a time period and/or frequency range that exposes the devices to a lower probability of interference may be selected. For example, if a device performing process 707 will communicate with first devices that are subject to interference during the determined recurring time period and/or frequency range, the device performing process 707 may select a time period and/or frequency range when devices that are more likely to generate interference are not communicating. In some aspects, the time period and/or frequency range may be selected based on a number of devices expected to communicate during the time period and/or frequency range, and/or when devices relatively closer to the first devices, or with relatively higher transmission strengths at the first devices are less likely to be communicating.

Alternatively, if a device performing process 707 intends to communicate with second devices not subject to interference during the time period and/or frequency range. the time period and/or frequency range may be selected based on the second devices being "more tolerant" of interference. For example, a time period and/or frequency range may be selected when generally more devices are expected to be communicating, or devices with relatively stronger transmission signals may be communicating, or devices relatively closer to the second devices may be communicating.

In block 725, communication with a wireless device is performed within the recurring time period and within the determined frequency range. Block 725 may be performed within either blocks 704 or 706 of process 700.

Figure 7C:
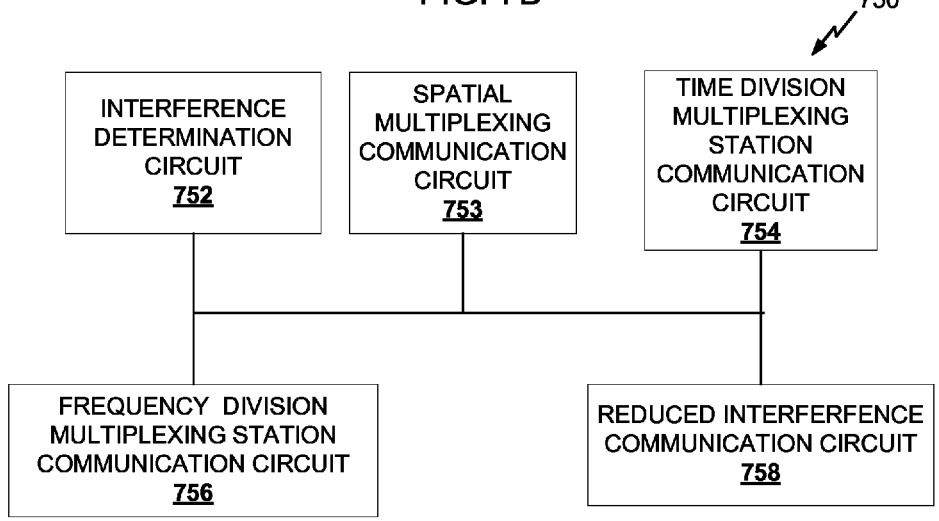
FIG. 7C shows a functional block diagram for a wireless communication apparatus that may be employed within the wireless communication systems of FIGS. 1, 2B, and 3.

FIG. 7C shows a functional block diagram for a wireless communication apparatus. Those skilled in the art will appreciate that a wireless communication apparatus may have more components than the simplified wireless communication apparatus 402 shown in FIG. 4. The wireless communication apparatus 750 shown includes only those components useful for describing some prominent features of implementations within the scope of the claims. The wireless communication apparatus 750 may include an interference determination circuit 752, a spatial multiplexing communications circuit 753, a time division multiplexing station circuit 754, a frequency division multiplexing station communication circuit 756, and a reduced interference communication circuit 758.

In some implementations, the interference determination circuit 752 may be configured to perform one or more of the functions discussed above with respect to block 702. The interference determination circuit 752 may include one or more of a programmable chip, a processor, a memory, and a network interface. For example, the interference determination circuit may include the processor 404. In some implementations, a means for determining whether a wireless device is subject to interference may include the interference determination circuit 752.

In some implementations, the spatial multiplexing communications circuit 753 may be configured to perform one or more of the functions discussed above with respect to block 704 and/or 706. The spatial multiplexing communications circuit 753 may include one or more of a programmable chip, a processor, a memory, and a network interface. For example, the spatial multiplexing communications circuit 753 may include the processor 404. In some implementations, a means for determining a set of multiplexing parameters, such as parameters defining beam forming methods or the use of selective antennas, may include the spatial multiplexing communications circuit 753.

In some implementations, the time division multiplexing station communication circuit 754 may be configured to perform one or more functions discussed above with respect to blocks 704, 706, and/or 725. The time division multiplexing station communication circuit 754 may include one or more of a programmable chip, a processor, a memory, and a network interface. For example, the reduced interference transmission circuit may include the processor 404. In some implementations, a means for determining a set of multiplexing parameters, such as a recurring time period may include the time division multiplexing station communication circuit 754.

In some implementations, the frequency division multiplexing station communication circuit 756 may be configured to perform one or more functions discussed above with respect to blocks 704, 706, 720, and/or 725. The frequency division multiplexing station communication circuit 756 may include one or more of a programmable chip, a processor, a memory, and a network interface. For example, the reduced interference transmission circuit may include the processor 404. In some implementations, a means for determining a set of multiplexing parameters, such as frequency ranges may include the frequency division multiplexing station communication circuit 756.

In some implementations, the reduced interference communication circuit 758 may be configured to perform one or more functions discussed above with respect to blocks 704 and/or 706. The reduced interference communication circuit 758 may include one or more of a programmable chip, a processor, a memory, and a network interface. For example, the reduced interference transmission circuit may include the transmitter 410. In some implementations, a means for transmitting a message to a wireless device using a set of multiplexing parameters may include the reduced interference communication circuit 758. In some aspects, a means for communicating with a wireless device during a recurring time period and/or a frequency range may include the reduced interference communication circuit 758.

Figure 7D:
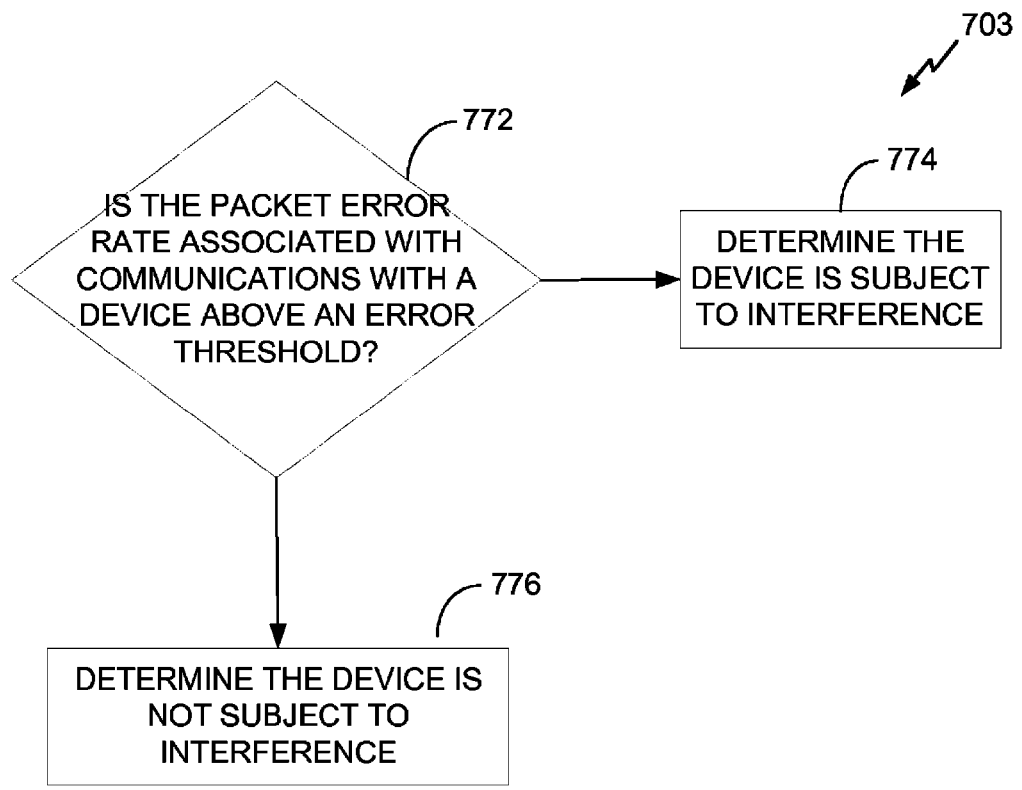
FIG. 7D is a flowchart of a process for determining whether a device is subject to interference.

FIG. 7D is a flowchart of a process for determining whether a device is subject to interference. In one aspect, process 703 may be performed as part of process 700, discussed with respect to FIG. 7A. Specifically, process 703 may be performed by one aspect of block 702. In some aspects, block 702 may not perform process 703. In one aspect, the process 703 may be performed by the wireless device 402, illustrated in FIG. 4. In one aspect, process 703 may be performed by an access point.

In block 772, process 703 evaluates a packet error rate associated with communications with a device. If the packet error rate is above a threshold, decision block 774 determines that the device is subject to interference. If the packet error rate is below the threshold (or a different threshold), then the device is determined not to be subject to interference in block 776.

Some aspects of decision block 772 may consider other parameters associated with communications with a device when determining whether the device is subject to interference. For example, some implementations may consider conditions or parameters associated with a link condition and/or topology. For example, in some aspects, a first device that is more than a threshold distance from a second device performing process 703 may be determined to be subject to interference by decision block 772. In some aspects, process 703 may be performed by the interference determination circuit 752 discussed above.

Figure 7E:
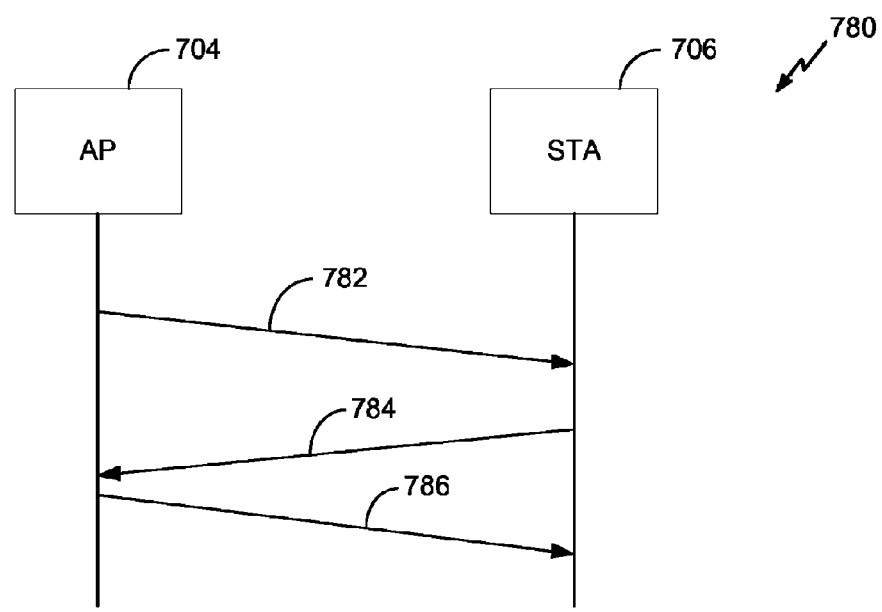
FIG. 7E is a sequence diagram showing a message exchange between an access point and a station using a combination of one or more of spatial division multiplexing, time division multiplexing, or frequency division multiplexing.

FIG. 7E is a sequence diagram showing a message exchange between an access point and a station using a combination of one or more of spatial division multiplexing, time division multiplexing, or frequency division multiplexing. AP 704 first sends a message 782 to STA 706. The message indicates one or more multiplexing parameters that the STA 706 should use when communicating with AP 704. In some aspects, the multiplexing parameters may indicate or include one or more of beam forming parameters, selective antenna parameters, one or more recurring time periods for use within a time division multiplexing scheme, and/or one or more frequency ranges for use in a frequency division multiplexing scheme.

Messages 784 and 786 are then exchanged between the AP 704 and the STA 706 based on the multiplexing parameters indicated by message 782.

Figure 7F:
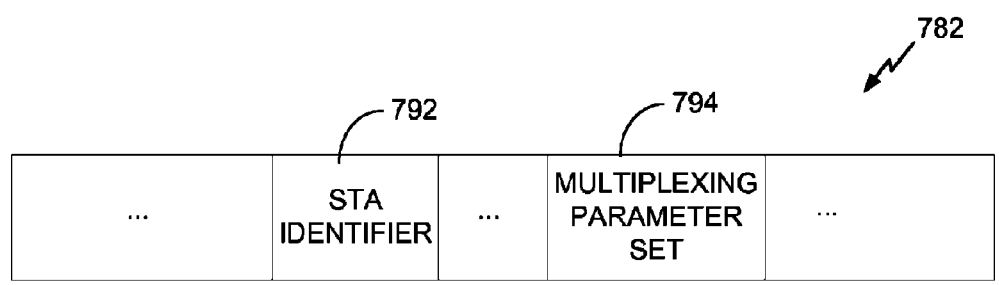
FIG. 7F is an exemplary message format for a message indicating multiplexing parameters.

FIG. 7F is an exemplary message format for a message indicating multiplexing parameters. In some aspects, the message 782 is transmitted from an access point to a station. The message 782 includes at least two fields, an STA identifier field 792 and a multiplexing parameter set field 794. In some aspects, the STA identifier field 792 may be included in a media access control header of message 782. For example, the STA identifier field 792 may be equivalent to a destination MAC address in a media access control header.

The multiplexing parameter set field indicates or includes a multiplexing parameter set that the station should use when communicating with the transmitter of message 782, in some aspects, an access point. As discussed above, the multiplexing parameter set may include or indicate one or more parameters that define a multiplexing method for use in communication with an access point. For example, the multiplexing parameter set may include one or more of an indication of a recurring time period within a time division multiplexing scheme, a frequency range for use in a frequency division multiplexing scheme, one or more beam forming parameters for use when transmitting a message to the access point, or selective antenna parameters to determine how a plurality of antennas should be employed when transmitting a message to the access point.

Figure 7G:
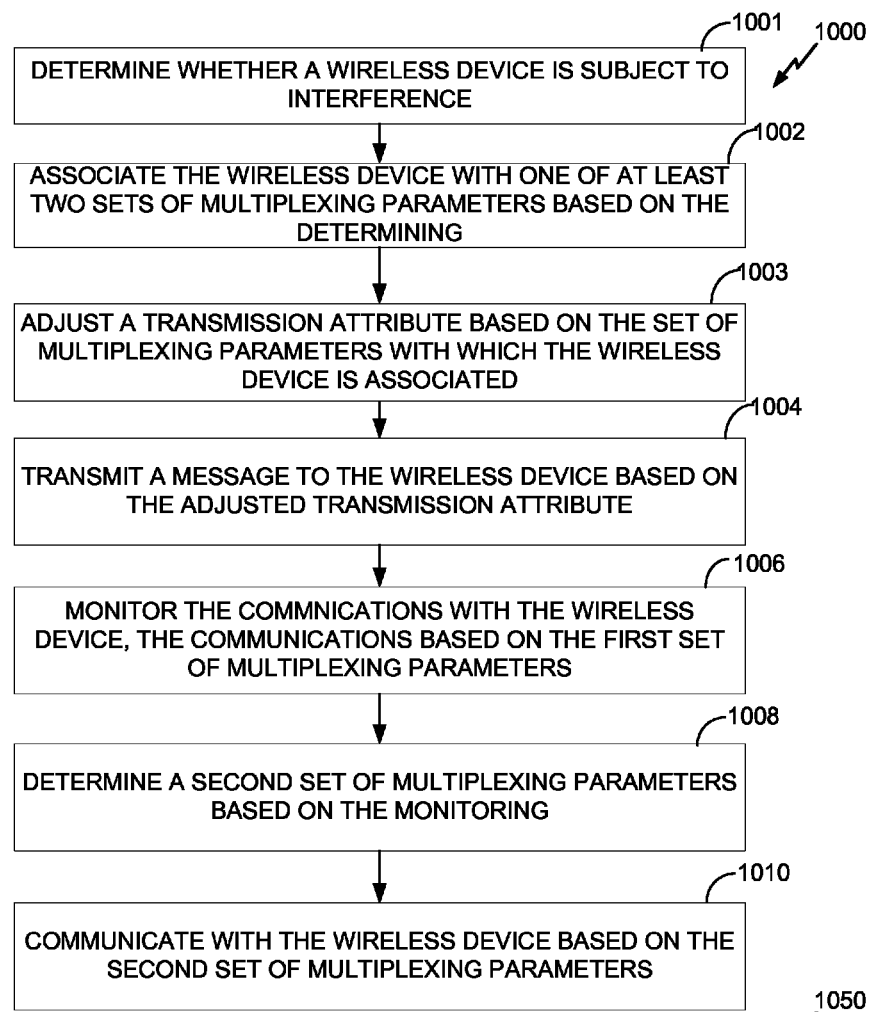
FIG. 7G is a flowchart of a method of dynamically determining multiplexing parameters for communication with a wireless device.

FIG. 7G is a flowchart of a method of dynamically determining multiplexing parameters for communication with a wireless device. In one aspect, process 1000 may be performed as part of process 700, discussed with respect to FIG. 7A. For example, after a wireless device is initially characterized based on its interference characteristics, it may be associated with a group of wireless devices that have similar characteristics. Each group of wireless devices may then be associated with particular multiplexing parameters that control how a transmitting device communicates with any of the devices in a particular group. The interference characteristics of each of the devices may be periodically assessed. This periodic assessment may result in one or more of the devices moving from a first group to a second group or a third group.

For example, a wireless device may be operating in close proximity to an access point, with the access point causing significant interference with communications to the wireless device. At some later point in time, the interfering access point may cease operating. This may reduce the amount of interference experienced by the wireless device, allowing it to move from a group reserved for devices under heavy interference, to a group of devices experiencing relatively less interference. By periodically characterizing the amount of interference being experienced by devices with which a transmitter is in communication, the transmitter may be able to better adapt how it communicates with those devices based on the current wireless environment.

Block 1001 determines whether a wireless device is subject to interference. Determining whether a wireless device is subject to interference may be performed in substantial accordance with any of the processes discussed above, including process 703 of FIG. 7D or block 702 of FIG. 7A.

In block 1002, the wireless device is associated with one of at least two sets of multiplexing parameters based on the determining. A first and/or second set of multiplexing parameters may include parameters defining one or more of a time division multiplexing scheme, a frequency division multiplexing scheme, or a spatial multiplexing scheme, as discussed above. For example, a set of multiplexing parameters may include parameters identifying a recurring time period in which to transmit or a frequency range in which to transmit, or a combination of these parameters.

In block 1003, a transmission attribute is adjusted based on the set of multiplexing parameters with which the wireless device is associated. For example, the multiplexing parameters, as described above, may define a frequency upon which a message should be transmitted to the wireless device. Thus, a transmission frequency attribute may be adjusted based on the associated set of multiplying parameters in some aspects. In another example, the associated set of multiplexing parameters may define a recurring time period in which transmissions to the wireless device should be performed. Therefore, a transmission attribute that controls when a transmission to the wireless device occurs may be adjusted based on these example multiplexing parameters.

Block 1004 communicates with the wireless device based on the associated set of multiplexing parameters. For example, if the first set of multiplexing parameters indicate that communication with the wireless device should be performed within a particular frequency range and during a particular recurring time period, then the communication occurring in block 1004 conforms with those parameters. In some aspects, communicating based on an associated set of multiplexing parameters may include transmitting and/or receiving messages to/from the wireless device.

Along with the adjustment of transmission attributes discussed above with respect to block 1003, reception attributes may also be adjusted based on the associated set of multiplexing parameters. For example, if the multiplexing parameters define a frequency range upon which communication with the wireless device will be performed, a device performing process 1000 may tune a receiver to ensure signals transmitted over the frequency range defined by the multiplexing parameters are properly received from the wireless device.

In block 1006, communications with the wireless device are monitored. Monitoring may include comparing one or more network statistics associated with the communication to one or more quality thresholds. For example, a packet error rate associated with the communications may be compared to one or more error thresholds. A received signal strength indication, and/or packet collision statistics of the wireless device may also be considered in the monitoring.

In block 1008, a second set of multiplexing parameters is determined based on the monitoring. In some aspects, the second set of multiplexing parameters may be associated with a second group of wireless devices that have similar communication characteristics with the wireless device being monitored. Note that the second set of multiplexing parameters may be a different set of multiplexing parameters than the at least two sets of multiplexing parameters discussed with respect to block 1002 above.

In some aspects, the second set of multiplexing parameters may be equivalent to the first set of multiplexing parameters. For example, if the quality indicators monitored in block 1006 fall within acceptable limits, no changes to the multiplexing parameters may be made. Alternatively, if one or more quality parameters monitored during block 1006 fall outside of acceptable ranges, or outside ranges associated with the current group (or current multiplexing parameters) with which the wireless device is associated, one or more multiplexing parameters may be modified in an attempt to improve the quality of communications with the wireless device. In some aspects, the wireless device may be associated with a different group of wireless devices, with the different group having associated with it the second set of multiplexing parameters.

In block 1010, communication with the wireless device is performed based on the second set of multiplexing parameters. As discussed above with respect to blocks 1003 and 1004, communicating with the wireless device based on the multiplexing parameters may include adjusting one or more of a transmission attribute and/or a reception attribute controlling how communication with the wireless device is performed. Note that in some aspects of process 1000, blocks 1006-1010 may not be performed.

Figure 7H:
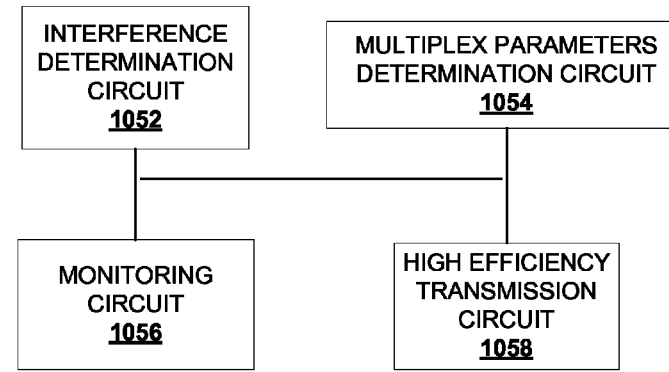
FIG. 7H shows a functional block diagram for a wireless communication apparatus.

FIG. 7H shows a functional block diagram for a wireless communication apparatus. Those skilled in the art will appreciate that a wireless communication apparatus may have more components than the simplified wireless communication apparatus 402 shown in FIG. 4. The wireless communication apparatus 1050 shown includes only those components useful for describing some prominent features of implementations within the scope of the claims. The wireless communication apparatus 1050 may include an interference determination circuit 1052, a multiplexing parameters determination circuit 1054, a monitoring circuit 1056, and a high efficiency transmission circuit 1058.

In some implementations, the interference determination circuit 1052 may be configured to perform one or more of the functions discussed above with respect to block 1001. The interference determination circuit 1052 may include one or more of a programmable chip, a processor, a memory, and a network interface. For example, the interference determination circuit 1052 may include the processor 404. In some implementations, a means for determining whether a device is subject to interference may include the interference determination circuit 1052.

In some implementations, the multiplexing parameters determination circuit 1054 may be configured to perform one or more of the functions discussed above with respect to blocks 1002 and/or 1008. The multiplexing parameters determination circuit 1054 may include one or more of a programmable chip, a processor, a memory, and a network interface. For example, the multiplexing parameters determination circuit 1054 may include the processor 404. In some implementations, a means for determining multiplexing parameters may include the multiplexing parameters determination circuit 1054.

In some implementations, the monitoring circuit 1056 may be configured to perform one or more of the functions discussed above with respect to block 1006. The monitoring circuit 1056 may include one or more of a programmable chip, a processor, a memory, and a network interface. For example, the monitoring circuit 1056 may include the processor 404. In some implementations, a means for monitoring communications may include the monitoring circuit 1056.

In some implementations, the high efficiency transmission circuit 1058 may be configured to perform one or more of the functions discussed above with respect to blocks 1003-1004 and/or 1010. The high efficiency transmission circuit 1058 may include one or more of a programmable chip, a processor, a memory, and a network interface. For example, the high efficiency transmission circuit 1058 may include the transmitter 410 and/or the receiver 412. In some implementations, a means for communicating with a wireless device may include the high efficiency transmission circuit 1058.

Figure 8A:
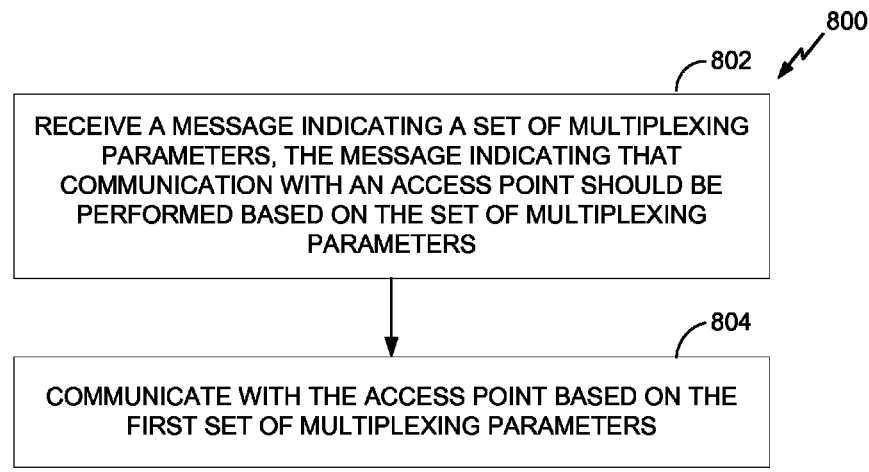
FIG. 8A is a flowchart of a process for transmitting a wireless message from a first wireless device to a second wireless device in a dense wireless environment.

FIG. 8A is a flowchart of a process for transmitting a wireless message from a first wireless device to a second wireless device in a dense wireless environment. In one aspect, a dense wireless environment may include the communications system 250 illustrated in FIG. 2B. In one aspect, the process 800 may be performed by the wireless device 402, illustrated in FIG. 4. In one aspect, process 800 may be performed by a station.

In block 802, a message is received. The message indicates a first set of multiplexing parameters. The message indicates that communications with an access point should be performed based on the set of multiplexing parameters. In some aspects, the first set of multiplexing parameters may define a recurring time period within a contention period for communication with the access point. In some aspects, the message is received from the access point. In some aspects, the received message is broadcast. In some aspects, the set of multiplexing parameters may indicate a second recurring time period for communication with the access point.

In block 804, communication with the access point is performed based on the first set of multiplexing parameters. Communication with the access point may include transmitting a message to the access point and/or receiving a message from the access point.

In some aspects, communication with the access point may include transmitting a message to the access point but may not necessarily include receiving messages from the access point. In some aspects, while some messages may be received from the access point during a first recurring time period defined by the first set of multiplexing parameters, other messages may be received from the access point outside of the first recurring time period. Therefore, in some aspects, the first set of multiplexing parameters do not define how all communication should be performed with the access point, but may instead define how a subset of particular communication should be performed with the access point.

Figure 8B:
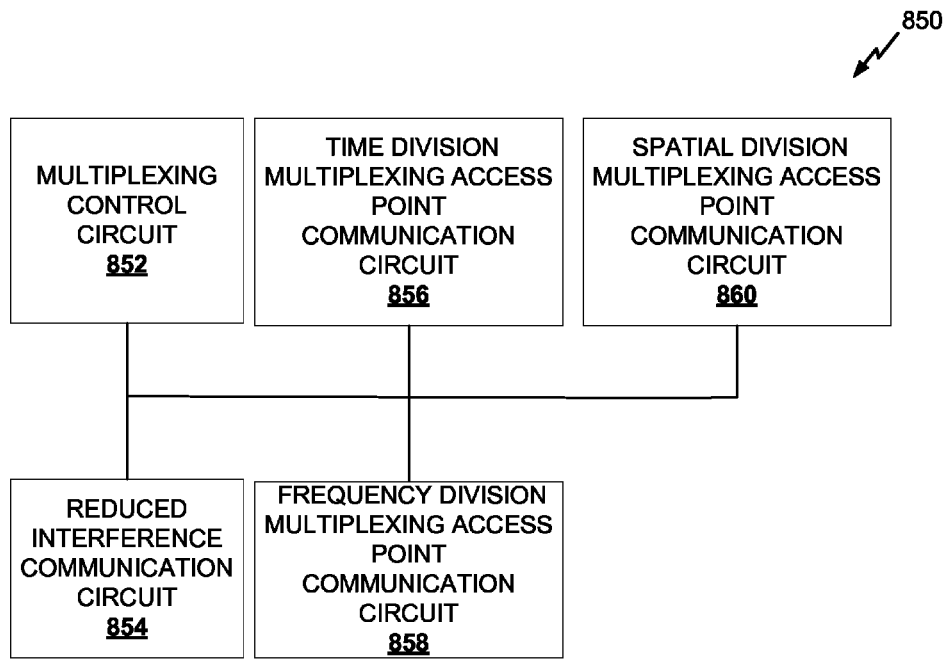
FIG. 8B shows a functional block diagram for a wireless communication apparatus that may be employed within the wireless communication systems of FIGS. 1, 2B, and 3.

FIG. 8B shows a functional block diagram for a wireless communication apparatus. Those skilled in the art will appreciate that a wireless communication apparatus may have more components than the simplified wireless communication apparatus 402 shown in FIG. 4. The wireless communication apparatus 850 shown includes only those components useful for describing some prominent features of implementations within the scope of the claims. The wireless communication apparatus 850 may include a multiplexing control circuit 852, a reduced interference transmission circuit 854, a time division multiplexing AP communication circuit 856 a frequency division multiplexing AP communication circuit 858 and/or a spatial division multiplexing access point communications circuit 860.

In some implementations, the multiplexing (TDM) control circuit 852 may be configured to perform one or more of the functions discussed above with respect to block 802. The multiplexing control circuit 852 may include one or more of a programmable chip, a processor, a memory, and a network interface. For example, the multiplexing control circuit may include the receiver 412. In some implementations, a means for receiving a message indicating a first recurring time period may include the multiplexing control circuit 852.

In some implementations, the reduced interference communication circuit 854 may be configured to perform one or more of the functions discussed above with respect to block 804. The reduced interference communication circuit 854 may include one or more of a programmable chip, a processor, a memory, and a network interface. For example, the reduced interference communication circuit may include the transmitter 410 and/or the receiver 412. In some implementations, a means for transmitting and/or a means for communicating may include the reduced interference communication circuit 854.

In some implementations, the time division multiplexing AP communication circuit 856 may be configured to perform one or more of the functions discussed above with respect to block 804. The time division multiplexing AP communication circuit 856 may include one or more of a programmable chip, a processor, a memory, and a network interface. For example, the time division multiplexing AP communication circuit may include the processor 404. In some implementations, a means for transmitting and/or a means for communicating during a recurring time period may include the time division multiplexing AP communication circuit 856.

In some implementations, the frequency division multiplexing AP communication circuit 858 may be configured to perform one or more of the functions discussed above with respect to block 804. The frequency division multiplexing AP communication circuit 858 may include one or more of a programmable chip, a processor, a memory, and a network interface. For example, the frequency division multiplexing AP communication circuit may include the processor 404. In some implementations, a means for transmitting and/or a means for communicating within a selected frequency range may include the frequency division multiplexing AP communication circuit 858.

In some implementations, the spatial division multiplexing AP communication circuit 860 may be configured to perform one or more of the functions discussed above with respect to block 804. The spatial division multiplexing AP communication circuit 860 may include one or more of a programmable chip, a processor, a memory, and a network interface. For example, the spatial division multiplexing AP communication circuit may include the processor 404. In some implementations, a means for transmitting and/or a means for communicating using beam forming or selective antennas may include the spatial division multiplexing AP communication circuit 860.

Figure 9A:
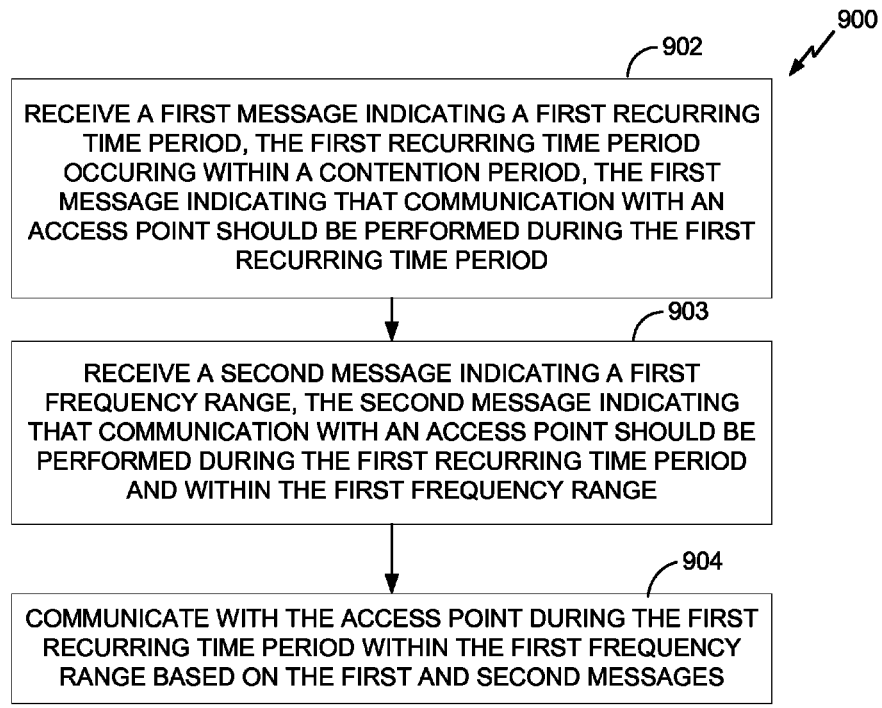
FIG. 9A is a flowchart of a process for transmitting a wireless message from a first wireless device to a second wireless device in a dense wireless environment.

FIG. 9A is a flowchart of a process for transmitting a wireless message from a first wireless device to a second wireless device in a dense wireless environment. In one aspect, a dense wireless environment may include the communications system 250 illustrated in FIG. 2B. In one aspect, the process 900 may be performed by the wireless device 402, illustrated in FIG. 4. In one aspect, process 900 may be performed by a station. In one aspect, process 900 may be performed as part of process 800 described above with respect to FIG. 8A.

In block 902, a message is received. The message indicates a first recurring time period within a contention period for communication with an access point. In some aspects, the message is received from the access point. In some aspects, the received message is broadcast. In some aspects, the message may indicate a second recurring time period for communication with the access point.

In block 903, a second message is received. The second message indicates a first frequency range. The second message also indicates that communication with an access point should be performed during the first recurring time period and within the first frequency range.

In block 904, communication with the access point is performed during the first recurring time period and within the first frequency range based on the received message. Communication with the access point may comprise transmitting a message to the access point or receiving a message from the access point.

In some aspects, communication with the access point may comprise transmitting a message to the access point but may not necessarily include receiving messages from the access point. In some aspects, while some messages may be received from the access point during the first recurring time period and within the first frequency range, other messages may be received from the access point outside the first recurring time period and outside the first frequency range. For example, in some aspects, a beacon message may be received from the access point outside the first frequency range.

Figure 9B:
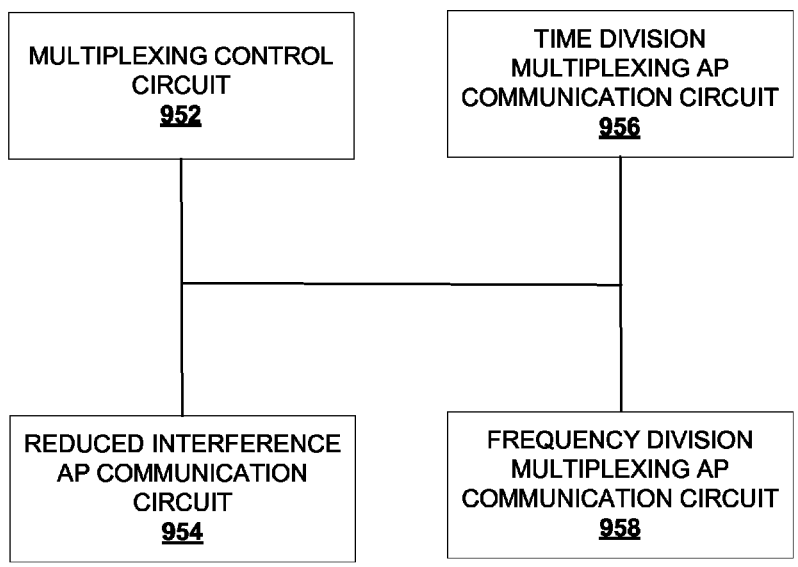
FIG. 9B shows a functional block diagram for a wireless communication apparatus that may be employed within the wireless communication systems of FIGS. 1, 2B, and 3.

FIG. 9B shows a functional block diagram for a wireless communication apparatus. Those skilled in the art will appreciate that a wireless communication apparatus may have more components than the simplified wireless communication apparatus 402 shown in FIG. 4. The wireless communication apparatus 950 shown includes only those components useful for describing some prominent features of implementations within the scope of the claims. The wireless communication apparatus 950 may include a multiplexing control circuit 952, a time division multiplexing access point communication circuit 956, a frequency division multiplexing AP communication circuit 958, and/or a reduced interference access point communication circuit 954. In some aspects, the device 950 is the device 850.

In some implementations, the multiplexing control circuit 952 may be configured to perform one or more of the functions discussed above with respect to blocks 902 and/or 903. The multiplexing control circuit 952 may include one or more of a programmable chip, a processor, a memory, and a network interface. For example, the multiplexing control circuit may include the receiver 412. In some implementations, a means for multiplexing or means for receiving may include the multiplexing control circuit 952.

In some implementations, the reduced interference access point communication circuit 954 may be configured to perform one or more of the functions discussed above with respect to block 904. The reduced interference access point communication circuit 954 may include one or more of a programmable chip, a processor, a memory, and a network interface. For example, the reduced interference access point communication circuit may include the transmitter 410. In some implementations, a means for transmitting and/or a means for communicating may include the reduced interference access point communication circuit 954.

In some implementations, the time division multiplexing access point communication circuit 956 may be configured to perform one or more of the functions discussed above with respect to block 904. The time division multiplexing access point communication circuit 956 may include one or more of a programmable chip, a processor, a memory, and a network interface. For example, the time division multiplexing circuit may include the processor 404. In some implementations, a means for transmitting and/or a means for communicating during a recurring time period may include the time division multiplexing access point communication circuit 956.

In some implementations, the frequency division multiplexing access point communication circuit 958 may be configured to perform one or more of the functions discussed above with respect to block 904. The frequency division multiplexing access point communication circuit 958 may include one or more of a programmable chip, a processor, a memory, and a network interface. For example, the frequency division multiplexing circuit may include the processor 404. In some implementations, a means for transmitting and/or a means for communicating within a frequency range may include the frequency division multiplexing access point communication circuit 958.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of transmitting a wireless message from a first wireless device to a second wireless device on a medium utilizing carrier sense multiple access (CSMA), comprising:
   determining, by the first wireless device, whether each of a plurality of second wireless devices is individually subject to interference;
   individually associating, via the first wireless device, each of the second wireless devices with one of at least two sets of multiplexing parameters based on the determining;
   determining, by the first wireless device, a first set of one or more access points communicating during a first recurring time period, and a second different set of one or more access points communicating during a second different recurring time period;
   individually selecting by the first wireless device, one of the first or second recurring time periods for transmission of messages to each of the plurality of second wireless devices based on the set of multiplexing parameters with which each of the plurality of second wireless devices is individually associated and based on a number of access points in each of the first set and second sets of one or more access points; and
   transmitting, by the first wireless device, to each of the plurality of second wireless devices during the device's individually selected recurring time period.

2. The method of claim 1, further comprising basing the determining of whether each of the plurality of second wireless devices is individually subject to interference on one or more of a distance from the first wireless device to the second wireless device, network statistics associated with communications between the first wireless device and second wireless device, and a wireless link condition or topology between the first wireless device and the second wireless device.

3. The method of claim 2, further comprising basing the determining on one or more of: a packet error rate, a transmit power of a message received from the second wireless device, and the second wireless device's actual or attempted throughput.

4. The method of claim 2, further comprising basing the determining on a signal strength of the second wireless device.

5. The method of claim 4, further comprising determining the second wireless device to be subject to interference if the signal strength of the second wireless device is below a strength threshold.

6. The method of claim 1,
   wherein selection of the first recurring time period for a particular second wireless device is in response to the particular second wireless device being subject to interference; and
   transmitting one or more messages to the particular second wireless device during the second recurring time period in response to the second wireless device being not subject to interference.

7. The method of claim 6, further comprising:
   transmitting one or more messages to another wireless device during the first recurring time period if the other wireless device is subject to interference; and
   transmitting one or more messages to the other wireless device during the second recurring time period if the other wireless device is not subject to interference.

8. The method of claim 6, further comprising transmitting an indication message to the particular second wireless device indicating when the first or second recurring time periods occur.

9. The method of claim 8, further comprising broadcasting the indication message.

10. The method of claim 8, further comprising transmitting the indication message to the particular second wireless device if the particular second wireless device is subject to interference.

11. The method of claim 8, further comprising indicating when the first or second recurring time periods occur based on a beacon interval.

12. The method of claim 11, further comprising transmitting the indication message as a beacon message.

13. The message of claim 11, further comprising indicating the first or second time period relative to timing of a beacon message.

14. The method of claim 6, further comprising transmitting a message to an access point, the message indicating when the first or second recurring time period occurs.

15. The method of claim 6, further comprising receiving a message from an access point, the message indicating the first or second recurring time period.

16. The method of claim 6, wherein a first number of access points communicate during the first recurring time period, and a second number of access points communicate during the second recurring time period.

17. The method of claim 16, wherein the first number is less than the second number.

18. The method of claim 6, further comprising determining a first frequency band, wherein messages transmitted during the first recurring time period are transmitted within the first frequency band, and wherein an access point communicates in a second frequency band during the first recurring time period.

19. The method of claim 18, wherein the determining of the first frequency band comprises randomly selecting the first frequency band.

20. The method of claim 18, wherein the determining of the first frequency band is based on communication with the access point.

21. The method of claim 20, further comprising receiving a message assigning communications during the first recurring time period to the first frequency band, wherein the determining is based on the received message.

22. The method of claim 18, further comprising determining the first frequency band is a primary channel.

23. The method of claim 6, further comprising:
determining a plurality of candidate recurring time periods; and
randomly selecting the first recurring time period from the plurality of candidate recurring time periods.

24. The method of claim 7, further comprising determining a duration of the first or second recurring time period based on a network load.

25. The method of claim 7, further comprising determining a duration of the first or second recurring time period based on a number of failed MCS0 connection requests by associated stations.

26. The method of claim 1, further comprising:
monitoring communications with each of the plurality of second wireless devices after the selection of a recurring time period; and
associating at least one of the plurality of second wireless devices with a second set of multiplexing parameters based on the monitoring.

27. The method of claim 26, further comprising selecting a second recurring time period based on the second set of multiplexing parameters.

28. The method of claim 27, wherein a first frequency band used for transmission and indicated by a first set of multiplexing parameters is different than a second frequency band used for transmission and indicated by the second set of multiplexing parameters.

29. The method of claim 27, further comprising determining a frequency schedule based on communications with one or more access points, wherein the selecting of the second recurring time period is based on at least the frequency schedule.

30. The method of claim 27, wherein the frequency schedule indicates one or more of the number of recurring time periods or frequency bands, a size or duration of recurring time periods or frequency bands, a time reference for a set of recurring time periods or frequency bands.

31. The method of claim 1, further comprising inhibiting communication during the second recurring time period based on a message received from an access point.

32. The method of claim 1, further comprising selecting the first recurring time period in response to the number of access points communicating during the first recurring time period being below a threshold.

33. The method of claim 1, further comprising:
determining a particular wireless device is not subject to interference; and
selecting the second recurring time period for transmission of messages to the particular wireless device based on the particular wireless device not being subject to interface and based on a second number of access points communicating during the second recurring time period being above a second threshold.

34. An apparatus for transmitting a wireless message to a wireless device on a medium utilizing carrier sense multiple access (CSMA), comprising:
a processor configured to:
determine whether each of a plurality of wireless devices is individually subject to interference,
individually associate each of the wireless devices with one of at least two sets of multiplexing parameters based on the determining,
determine a first set of one or more access points communicating during a first recurring time period, and a second different set of one or more access points communicating during a second different recurring time period;
individually select one of the first or second recurring time periods for transmission of messages to each of the plurality of wireless devices based on the set of multiplexing parameters with which each of the plurality of wireless devices is individually associated and based on a number of access points in each of the first set and second sets of one or more access points, and
a transmitter configured to transmit to each of the plurality of wireless devices during the device's individually selected recurring time period.

35. The apparatus of claim 34, wherein the processor is configured to determine whether each of the plurality of wireless devices is individually subject to interference based on one or more of more of a distance from the apparatus to the wireless device, network statistics associated with communications between the apparatus and wireless device, and a wireless link condition or topology between the apparatus and the wireless device.

36. The apparatus of claim 35, wherein the network statistics comprise one or more of a packet error rate, a transmit power of a message received from the wireless device, and the wireless device's actual or attempted throughput.

37. The apparatus of claim 34, wherein the processor is configured to determine that the wireless device is subject to interference if the packet error rate is above an error threshold.

38. The apparatus of claim 35, wherein the network statistics comprise a signal strength of the wireless device.

39. The apparatus of claim 34, wherein the processor is configured to determine that the wireless device is subject to interference if the signal strength is below a strength threshold.

40. The apparatus of claim 34, wherein the processor is configured to select the first recurring time period for a particular wireless device in response to determining that the particular wireless device wireless device is subject to interference, and the transmitter is further configured to transmit one or more messages to the particular wireless device during the second recurring time period if the wireless device is not subject to interference.

41. The apparatus of claim 40, further comprising:
a transmitter configured to transmit one or more messages to another wireless device during the first recurring time period if the other wireless device is subject to interference; and
a transmitter configured to transmit one or more messages to the other wireless device during a second recurring time period if the other wireless device is not subject to interference.

42. The apparatus of claim 40, further comprising a transmitter configured to transmit a message to the particular wireless device indicating when the first or second recurring time periods occur.

43. The apparatus of claim 42, wherein the message is broadcast.

44. The apparatus of claim 42, wherein the message is transmitted to the wireless device if the particular wireless device is subject to interference.

45. The apparatus of claim 42, wherein the indication is based on a beacon interval.

46. The apparatus of claim 45, wherein the message is a beacon message.

47. The apparatus of claim 45, wherein the indication of the first or second time period is relative to timing of a beacon message.

48. The apparatus of claim 40, further comprising a transmitter configured to transmit a message to an access point, the message indicating when the first or second recurring time periods occur.

49. The apparatus of claim 40, further comprising a receiver configured to receive a message from an access point, the message indicating the first or second recurring time period.

50. The apparatus of claim 40, wherein a first number of access points communicate during the first recurring time period, and a second number of access points communicate during the second recurring time period, and wherein the first number is less than the second number.

51. The apparatus of claim 40, further comprising a processor configured to determine a first frequency band, wherein messages transmitted during the first recurring time period are transmitted within the first frequency band, and wherein an access point communicates in a second frequency band during the first recurring time period.

52. The apparatus of claim 51, wherein the processor is configured to determine of the first frequency band by randomly selecting the first frequency band.

53. The apparatus of claim 51, wherein the processor is configured to determine the first frequency band based on communication with a second access point.

54. The apparatus of claim 53, further comprising a receiver configured to receive a message assigning communications during the first recurring time period to the first frequency band, wherein the processor is configured to determine the frequency band based on the received message.

55. The apparatus of claim 51, wherein the first frequency band corresponds to a primary channel.

56. The apparatus of claim 40, further comprising a processor configured to randomly select the first recurring time period from a plurality of candidate recurring time periods.

57. The apparatus of claim 41, further comprising a processor configured to determine a duration of the first or second recurring time period based on a network load.

58. The apparatus of claim 41, further comprising a processor configured to determine a duration of the first or second recurring time period based on a number of failed MCS0 connection requests by associated stations.

59. The apparatus of claim 34, further comprising:
a processor configured to monitor communications with each of the plurality of wireless devices after the selection of a recurring time period, and configured to associate at least one of the plurality of wireless devices with a second set of multiplexing parameters based on the monitoring.

60. The apparatus of claim 59, wherein a first frequency band indicated by a first set of multiplexing parameters and used for transmissions with the wireless device is different than a second frequency band indicated by the second set of multiplexing parameters and used for transmissions with the wireless device.

61. The apparatus of claim 60, further comprising a processor configured to determine a frequency schedule based on communications with one or more access points, wherein the selection of the first and second sets of multiplexing parameters is based on at least the frequency schedule.

62. The apparatus of claim 61, wherein the frequency schedule indicates one or more of the number of recurring time periods or frequency bands, a size or duration of recurring time periods or frequency bands, a time reference for a set of recurring time periods or frequency bands.

63. The apparatus of claim 34, wherein the processor is further configured to inhibit communication during the second recurring time period based on a message received from an access point.

64. The apparatus of claim 34, wherein the processor is further configured to select the first recurring time period in response to the number of access points communicating during the first recurring time period being below a threshold.

65. The apparatus of claim 34, wherein the processor is further configured to:
determine a particular wireless device is not subject to interference; and
select the second recurring time period for transmission of messages to the particular wireless device based on the particular wireless device not being subject to interface and based on a second number of access points communicating during the second recurring time period being above a second threshold.

66. An apparatus for transmitting a wireless message to a wireless device on a medium utilizing carrier sense multiple access (CSMA), comprising:
means for determining whether each of a plurality of wireless devices is individually subject to interference;
means for individually associating each of the plurality of wireless devices with one of at least two sets of multiplexing parameters based on the determining;
means for determining a first set of one or more access points communicating during a first recurring time period, and a second different set of one or more access points communicating during a second different recurring time period;
means for individually selecting one of the first or second recurring time periods for transmission of messages to each of the plurality of wireless devices based on the set of multiplexing parameters with which each of the plurality of second wireless device is individually associated and based on a number of access points in each of the first set and second sets of one or more access points; and
means for transmitting to each of the plurality of wireless devices during the device's individually selected recurring time period.

67. The apparatus of claim 66, wherein the means for determining whether each of the plurality of wireless devices is individually subject to interference is configured to determine whether each of the plurality of wireless devices is subject to interference based on one or more of more of a distance from the apparatus to the wireless device, network statistics associated with communications between the apparatus and wireless device, and a wireless link condition or topology between the apparatus and the wireless device.

68. The apparatus of claim 67, wherein the network statistics comprise one or more of a packet error rate, a transmit power of a message received from the wireless device, and the wireless device's actual or attempted throughput.

69. The apparatus of claim 68, wherein the means for determining whether the wireless device is subject to interference is configured to determine the wireless device is subject to interference if the packet error rate is above an error threshold.

70. The apparatus of claim 67, wherein the network statistics comprise a signal strength of the wireless device.

71. The apparatus of claim 68, wherein the means for determining whether each of the plurality of wireless devices is individually subject to interference is configured to determine whether each of the plurality of the wireless devices is subject to interference if the signal strength of the individual wireless device is below a strength threshold.

72. The apparatus of claim 66, further comprising:
means for transmitting one or more messages to a particular device of the plurality of wireless devices during a second recurring time period in response to the particular wireless device being not subject to interference.

73. The apparatus of claim 72, further comprising:
means for transmitting one or more messages to another wireless device during the first recurring time period if the other wireless device is subject to interference; and
means for transmitting one or more messages to the other wireless device during the second recurring time period if the other wireless device is not subject to interference.

74. The apparatus of claim 72, further comprising means for transmitting a message to the wireless device indicating when the first or second recurring time periods occur.

75. The apparatus of claim 74, wherein the message is broadcast.

76. The apparatus of claim 74, wherein the message is transmitted to the particular wireless device if the wireless device is subject to interference.

77. The apparatus of claim 74, wherein the indication is based on a beacon interval.

78. The apparatus of claim 77, wherein the message is a beacon message.

79. The apparatus of claim 77, wherein the indication of the first or second time period is relative to timing of a beacon message.

80. The apparatus of claim 72, further comprising means for transmitting a message to an access point, the message indicating when the first or second recurring time periods occur.

81. The apparatus of claim 72, further comprising means for receiving a message from an access point, the message indicating the first or second recurring time period.

82. The apparatus of claim 72, wherein a first number of access points communicate during the first recurring time period, and a second number of access points communicate during the second recurring time period, and wherein the first number is less than the second number.

83. The apparatus of claim 72, further comprising means for determining a first frequency band, wherein messages transmitted during the first recurring time period are transmitted within the first frequency band, and wherein an access point communicates in a second frequency band during the first recurring time period.

84. The apparatus of claim 83, wherein the means for determining the first frequency band is configured to randomly selecting the first frequency band.

85. The apparatus of claim 83, wherein the means for determining the first frequency band is configured to determine the first frequency band based on communication with a second access point.

86. The apparatus of claim 85, further comprising means for receiving a message assigning communications during the first recurring time period to the first frequency band, wherein the determining is based on the received message.

87. The apparatus of claim 83, wherein the first frequency band corresponds to a primary channel.

88. The apparatus of claim 72, further comprising:
means for determining a plurality of candidate recurring time periods; and
means for randomly selecting the first recurring time period from the plurality of candidate recurring time periods.

89. The apparatus of claim 73, further comprising means for determining a duration of the first or second recurring time period based on a network load.

90. The apparatus of claim 73, further comprising means for determining a duration of the first or second recurring time period based on a number of failed MCS0 connection requests by associated stations.

91. The apparatus of claim 66, further comprising:
means for monitoring communications with each of the plurality of wireless devices after the selection of a recurring time period; and
means for associating at least one of the plurality of wireless devices with a second set of multiplexing parameters based on the monitoring;
means for selecting a second recurring time period for transmissions to the wireless device based on the second set of multiplexing parameters.

92. The apparatus of claim 91, wherein a first frequency band indicated by a first set of multiplexing parameters and used for transmissions to the wireless device is different than a second frequency band indicated by the second set of multiplexing parameters and used for transmissions to the wireless device.

93. The apparatus of claim 92, further comprising means for determining a frequency schedule based on communications with one or more access points, wherein the selection of the second recurring time period is based on at least the frequency schedule.

94. The apparatus of claim 93, wherein the frequency schedule indicates one or more of the number of recurring time periods or frequency bands, a size or duration of recurring time periods or frequency bands, a time reference for a set of recurring time periods or frequency bands.

95. The apparatus of claim 66, wherein the means for transmitting is configured to inhibit communication during the second recurring time period based on a message received from an access point.

96. The apparatus of claim 66, wherein the means for selecting is configured to select the first recurring time period in response to the number of access points communicating during the first recurring time period being below a threshold.

97. The apparatus of claim 66, further comprising:
means for determining a particular wireless device is not subject to interference; and
means for select the second recurring time period for transmission of messages to the particular wireless device based on the particular wireless device not being subject to interface and based on a second number of access points communicating during the second recurring time period being above a second threshold.

98. A non-transitory computer readable storage medium comprising instructions that when executed cause a processor to perform a method for transmitting a wireless message from a first wireless device to a second wireless device on a medium utilizing carrier sense multiple access (CSMA), the method comprising:

determining, by the first wireless device, whether each of a plurality of second wireless devices is individually subject to interference;

individually associating, via the first wireless device, each of the second wireless devices with one of at least two sets of multiplexing parameters based on the determining;

determining, by the first wireless device, a first set of one or more access points communicating during a first recurring time period, and a second different set of one or more access points communicating during a second different recurring time period;

individually selecting by the first wireless device, one of the first or second recurring time periods for transmission of messages to each of the plurality of second wireless devices based on the set of multiplexing parameters with which each of the plurality of second wireless devices is individually associated and based on a number of access points in each of the first set and second sets of one or more access points; and transmitting, by the first wireless device, to each of the plurality of second wireless devices during the device's individually selected recurring time period.

99. The computer readable storage medium of claim 98, further comprising determining whether each of the plurality of second wireless devices is individually subject to interference based on one or more of more of a distance from the first wireless device to the second wireless device, network statistics associated with communications between the first wireless device and second wireless device, and a wireless link condition or topology between the first wireless device and the second wireless device.

100. The computer readable storage medium of claim 99, wherein the network statistics comprise one or more of a packet error rate, a transmit power of a message received from the second wireless device, and the second wireless device's actual or attempted throughput.

101. The computer readable storage medium of claim 100, the method further comprising determining the second wireless device is subject to interference if the packet error rate is above an error threshold.

102. The computer readable storage medium of claim 99, wherein the network statistics comprise a signal strength of the second wireless device.

103. The computer readable storage medium of claim 102, the method further comprising determining the second wireless device is subject to interference if the signal strength is below a strength threshold.

104. The computer readable storage medium of claim 98, wherein selection of the first recurring time period for a particular second wireless device is in response to the particular second wireless device being subject to interference; and transmitting one or more messages to the particular second wireless device during the second recurring time period if the particular second wireless device is not subject to interference.

105. The computer readable storage medium of claim 104, the method further comprising:

transmitting one or more messages to another wireless device during the first recurring time period if a other wireless device is subject to interference; and transmitting one or more messages to the other wireless device during the second recurring time period if the other wireless device is not subject to interference.

106. The computer readable storage medium of claim 104, the method further comprising transmitting a message to the particular second wireless device indicating when the first or second recurring time periods occur.

107. The computer readable storage medium of claim 106, wherein the message is broadcast.

108. The computer readable storage medium of claim 106, wherein the message is transmitted to the particular second wireless device if the particular second wireless device is subject to interference.

109. The computer readable storage medium of claim 106, wherein the indication is based on a beacon interval.

110. The computer readable storage medium of claim 109, wherein the message indicating when the first or second recurring time periods occur is a beacon message.

111. The computer readable storage medium of claim 109, wherein the indication of the first or second time period is relative to timing of a beacon message.

112. The computer readable storage medium of claim 104, the method further comprising transmitting a message to an access point, the message indicating when the first or second recurring time periods occur.

113. The computer readable storage medium of claim 104, the method further comprising receiving a message from an access point, the message indicating the first or second recurring time period.

114. The computer readable storage medium of claim 104, wherein a first number of access points communicate during the first recurring time period, and a second number of access points communicate during the second recurring time period, and wherein the first number is less than the second number.

115. The computer readable storage medium of claim 104, the method further comprising determining a first frequency band, wherein messages transmitted during the first recurring time period are transmitted within the first frequency band, and wherein a third access point communicates in a second frequency band during the first recurring time period.

116. The computer readable storage medium of claim 115, further comprising determining of the first frequency band by randomly selecting the first frequency band.

117. The computer readable storage medium of claim 115, further comprising determining of the first frequency band based on communication with a second access point.

118. The computer readable storage medium of claim 117, the method further comprising receiving a message assigning communications during the first recurring time period to the first frequency band, wherein the determining is based on the received message.

119. The computer readable storage medium of claim 115, further comprising determining the first frequency band is a primary channel.

120. The computer readable storage medium of claim 104, the method further comprising:

determining a plurality of candidate recurring time periods; and randomly selecting the first recurring time period from the plurality of candidate recurring time periods.

121. The computer readable storage medium of claim 105, the method further comprising determining a duration of the first or second recurring time period based on a network load.

122. The computer readable storage medium of claim 105, the method further comprising determining a duration of the first or second recurring time period based on a number of failed MCS0 connection requests by associated stations.

123. The computer readable storage medium of claim 98, the method further comprising:
monitoring communications with each of the second wireless devices after the selection of a recurring time period;
associating at least one of the plurality of second wireless devices with a second set of multiplexing parameters based on the monitoring;
selecting a second recurring time period for transmissions to the second wireless device-based on the second set of multiplexing parameters; and
transmitting a message to the second wireless device based on the further adjusted transmission attribute.

124. The computer readable storage medium of claim 123, further comprising determining a first frequency band indicated by a first set of multiplexing parameters and used for transmissions to a particular second wireless device when the first set of multiplexing parameters is selected is different than a second frequency band indicated by the second set of multiplexing parameters and used for transmissions to the particular second wireless device when the second set of multiplexing parameters is selected.

125. The computer readable storage medium of claim 124, further comprising determining a frequency schedule based on communications with one or more access points, wherein the selection of the second recurring time period is based on at least the frequency schedule.

126. The computer readable storage medium of claim 125, wherein the frequency schedule indicates one or more of the number of recurring time periods or frequency bands, a size or duration of recurring time periods or frequency bands, a time reference for a set of recurring time periods or frequency bands.

127. The computer readable storage medium of claim 98, the method further comprising inhibiting communication during a second recurring time period based on a message received from an access point.

128. The computer readable storage medium of claim 98, the method further comprising selecting the first recurring time period in response to the number of access points communicating during the first recurring time period being below a threshold.

129. The computer readable storage medium of claim 98, the method further comprising:
determining a particular wireless device is not subject to interference; and
selecting the second recurring time period for transmission of messages to the particular wireless device based on the particular wireless device not being subject to interface and based on a second number of access points communicating during the second recurring time period being above a second threshold.

* * * * *